(12) United States Patent
Matsunaga

(10) Patent No.: US 8,103,220 B2
(45) Date of Patent: Jan. 24, 2012

(54) RADIO-RESOURCE MANAGEMENT SYSTEM AND METHOD THEREOF, AND MANAGEMENT APPARATUS, BASE STATION AND TERMINAL TO BE EMPLOYED FOR IT

(75) Inventor: Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/882,517

(22) Filed: Sep. 15, 2010

(65) Prior Publication Data

US 2011/0021238 A1 Jan. 27, 2011

Related U.S. Application Data

(62) Division of application No. 10/735,826, filed on Dec. 16, 2003, now Pat. No. 7,826,796.

(30) Foreign Application Priority Data

Dec. 24, 2002 (JP) ................................. 2002-371876

(51) Int. Cl.
*H04B 1/00* (2006.01)
(52) U.S. Cl. ...................................... 455/69; 455/452.2
(58) Field of Classification Search .................. 455/453, 455/436, 522, 450, 454, 62, 67.11, 560, 452.1, 455/69; 370/468, 330
See application file for complete search history.

(56) References Cited

U.S. PATENT DOCUMENTS

| | | | |
|---|---|---|---|
| 5,297,193 A | 3/1994 | Bouix et al. | |
| 5,649,303 A | 7/1997 | Hess et al. | |
| 5,794,157 A | 8/1998 | Haartsen | |
| 6,347,224 B1 | 2/2002 | Smyth et al. | |
| 6,650,655 B2 | 11/2003 | Alvesalo et al. | |

(Continued)

FOREIGN PATENT DOCUMENTS

DE 198 10 626 A1 9/1999

(Continued)

OTHER PUBLICATIONS

Naoki Furuiye, "A Switching Control Method for the Communication Frequencies in Wireless LAN Network," Technical Research Report of the Electronic Inforation and Communications Society, Electronic Information and Communications Society of Japan, Oct. 12, 2001, vol. 1, No. 357, pp. 43-50.

(Continued)

*Primary Examiner* — Tu X Nguyen
(74) *Attorney, Agent, or Firm* — Dickstein Shapiro LLP

(57) ABSTRACT

Terminals and base stations belonging to service areas 100 to 102 of plural radio operators periodically measure a radio-link quality and an availability ratio of a radio link to notify them to a radio-resource management server 40. The server 40 alters a frequency of the base station, and a transmitted-power quantity of the base station and the terminal based on these measured results to improve the radio-link quality, and reduces interference with a neighboring radio system. When a load is concentrated on a network of a specific radio operator, an instruction of handover is given to the terminal from the server 40 to realize a load distribution within the radio operator, and between the radio operators. When the server 40 detects excessive radio interference between the radio operators, it notifies occurrence of a fault, an interference quantity, a quantity of the transmitted power that the base station should attenuate, and the frequency that the base station should alter to the above radio operator that becomes an interference source.

10 Claims, 26 Drawing Sheets

U.S. PATENT DOCUMENTS

| | | |
|---|---|---|
| 2001/0005359 A1 | 6/2001 | Bergqvist |
| 2001/0016499 A1 | 8/2001 | Hamabe |
| 2001/0044306 A1 | 11/2001 | Shimono et al. |
| 2003/0003921 A1* | 1/2003 | Laakso .................. 455/453 |

FOREIGN PATENT DOCUMENTS

| | | |
|---|---|---|
| EP | 0 713 300 A1 | 5/1996 |
| EP | 0946072 A1 | 9/1999 |
| EP | 0948144 A2 | 10/1999 |
| EP | 1128573 A2 | 8/2001 |
| EP | 1 162 813 A2 | 12/2001 |
| JP | 9-219882 A | 8/1997 |
| JP | 11-285048 | 10/1999 |
| JP | 2000-316183 A | 11/2000 |
| JP | 2001-103531 | 4/2001 |
| JP | 2001-136581 | 5/2001 |
| JP | 2001-274816 | 10/2001 |
| JP | 2001-298467 | 10/2001 |
| JP | 2002-9664 | 1/2002 |
| JP | 2002-198899 | 7/2002 |
| WO | WO-99/45736 A1 | 9/1999 |
| WO | WO-00/35226 A1 | 6/2000 |

OTHER PUBLICATIONS

Yuki Moriya, "A Proposal for the Multicast Receiver Intensive Formula in Wireless LAN Hot Spots," Technical Research Report of the Electronic Information and Communications Society, Electronic Information and Communications Society of Japan, Sep. 23, 2002, vol. 102, No. 352.

European Search Report issued on Oct. 12, 2004.

Koji Fujii, "The Fourth Generation Portable Telephone that Subsumes Hot Spots, Future of the Next Generation High Speed Mobile Internet, Problem of Hot Spot Commercialization", Mobile Internet, Rick Tele-Com Company, Limited, vol. 1, No. 9, pp. 32-27 (Oct. 10, 2001).

Yuki Moritani and Yukio Atsumi; "Proposal of a Multicast Receiver Aggregation Method in Wireless LAN Hotspot"; Technical Report of the Institute of Electronics, Information and Communication Engineers; NS2002-115, IN2002-59, CS2002-70, vol. 102, No. 352, Sep. 23, 2002, pp. 37-42.

Naoke Fuke et al.; "Radio Channel Management in 2.4GHz Wireless LAN network"; Technical Report of the Institute of Electronics, Information and Communications Engineers, CS2001-100, vol. 101, No. 357, Oct. 12, 2001, pp. 43-50.

* cited by examiner

FIG. 5 FUNCTIONAL BLOCK DIAGRAM OF RADIO TERMINAL

FUNCTIONAL BLOCK DIAGRAM OF RADIO-RESOURCE MANAGEMENT SERVER

RADIO-RESOURCE MANAGEMENT SYSTEM AND METHOD THEREOF, AND MANAGEMENT APPARATUS, BASE STATION AND TERMINAL TO BE EMPLOYED FOR IT

CROSS-REFERENCE TO RELATED APPLICATIONS

The present application is a divisional of application Ser. No. 10/735,826, filed Dec. 16, 2003, the entire contents of which are incorporated herein by reference.

BACKGROUND OF THE INVENTION

The present invention relates to a radio-resource management system and a method thereof, a management apparatus, a base station and a terminal to be employed for it, and a program thereof, and more particularly to a technique of managing a radio resource extending over networks of a plurality of radio operators in a wireless network such as public mobile communication by a cellular technique, and a wireless LAN.

In a conventional wireless network, each radio operator installed radio base stations independently, and the radio resource such as a frequency channel that the radio base station and a radio terminal utilize, transmitted power of a radio link, and a transfer rate was managed independently operator by operator. In the event of the public mobile communication by the cellular technique, an exclusive right to the use of a frequency band is normally given to each operator as license, whereby no radio interference occurs between the operators, and the management of the radio resource is in a good state because it is independently managed enterprise by enterprise. In the event of assuming such an exclusive form of the radio resource by the license, the radio-resource management to be made by the radio operator becomes easy in the degree to which the interference from the other radio operator does not need to be considered.

In this case, however, even though a traffic demand is remarkably less than forecasted in a network of a specific radio operator, and there exists the radio resource excessively, it is impossible to accommodate the other radio operator with its excess, whereby the problem exists that availability efficiency of the frequency goes down.

On the other hand, in the event of a wireless LAN system employing a frequency band such as 2.4 GHz and 5 GHz that does not necessitate the license, not only networks of a plurality of the radio operators and private networks, but also the system other than the wireless LAN utilizing the same frequency band hold the radio resource in common. In the event of the wireless LAN, conventionally, each radio system was isolated in many cases, and there were few cases where intra-radio-system physical interference occurred between the operators because the maximum transmitted power was restricted at a relatively low level. Also, in operating the wireless LAN within an enterprise, also in the event that the wireless LAN areas overlap, to autonomously control the terminal or the radio base station alone sufficed for a radio-resource management method because it was relatively easy to realize unification of a management policy.

For example, as a method of the terminal's selecting the radio base station autonomously in the wireless LAN, there is a method in which, responding to a radio-link quality that the terminal measured, a load of the wireless LAN, and so forth, the terminal selects the radio base station for connection, of which the condition is best suitable for it (see patent documents 1 and 2).

Also, as an autonomous radio-resource management technique by the radio base station in the wireless LAN, there is a method of dynamically switching over an operational frequency channel of the wireless LAN responding to noise and interference (see patent document 3). Furthermore, as a technique of cooperatively managing the radio resource by the terminal and the radio base station, there is a method in which the radio base station stores statistic information of the link quality for respective radio terminals, and comes up with the other radio base stations that become a candidate for a migration destination in the order of priority (see patent document 4).

[Patent Document 1]
JP-P2001-298467A (pages 6 and 7, FIG. 6)
[Patent Document 2]
JP-P2001-274816A (pages 7 and 8, FIG. 4)
[Patent Document 3]
JP-P2002-009664A (page 2, FIG. 1 and FIG. 2)
[Patent Document 4]
JP-P2001-103531A (pages 2 to 5, FIG. 1 to FIG. 4)

These kinds of the autonomous radio-resource management by the terminal or the radio base station are relatively easy of realization, whereas the problem exists that they do not always function as originally planned because there is restriction to information that can be mutually notified between the wireless networks of the plural operators having different operational policies, and also, because the effect can be expected only when almost all terminals and radio base stations correspond to the autonomous radio-resource management.

In particular, the operator that provides an internet connection service by the wireless LAN in a public space such as an airport, an assembly fall, and a restaurant has rapidly increased in recent years, and from now on, the situation is expected where the service areas of the plural operators overlap inside the identical public space. In this case, a plurality of the radio operators mutually hold the radio resource in common, and as a result, the interference of the radio occurs between the systems. In the conventional autonomous radio-resource management technique, each radio operator is to alter the frequency channel of the radio base station, the transmitted power, the position of the radio base station, etc. so as to avoid the interference based on limited information that it can utilize; however optimal radio-resource allocation is not always made in the entire system having the plural operators brought together because information is limited. Also, in the event that a load was concentrated on a specific operator, such a scheme of distributing it among the operators did not exist. Also, in such a manner, a scheme of managing the radio resource of the plural operators in an integrated manner did not exist, whereby the service responding hereto was also not considered.

SUMMARY OF THE INVENTION

The objective of the present invention is to provide a radio-resource management system and a method thereof, a server, a base station and a terminal to be employed for it, and a program thereof that enable the radio resource, which is held in common, to be optimally operated, by managing a wireless network quality of a plurality of the radio operators in an integrated manner to alter the frequency channel of the radio base station, the transmitted power, the terminal to be accommodated, and so forth responding to a necessity.

The radio-resource management method in accordance with the present invention is characterized in including a control step of, based on radio-link quality information to be notified from at least one of a plurality of radio base stations and radio terminals belonging to respective different operators, taking alteration control of a frequency that said radio base station utilizes.

Another radio-resource management method in accordance with the present invention is characterized in including a control step of, based on radio-link quality information to be notified from at least one of a plurality of radio base stations and radio terminals belonging to respective different operators, taking transmitted-power control for said radio base station.

Yet another radio-resource management method in accordance with the present invention is characterized in including a control step of, based on radio-link quality information to be notified from at least one of a plurality of radio base stations and radio terminals belonging to respective different operators, taking distribution control of a load that is a radio terminal to be accommodated in said radio base station.

An additional radio-resource management method in accordance with the present invention is characterized in including a control step of, based on radio-link quality information to be notified from at least one of a plurality of radio base stations and radio terminals belonging to respective different operators, detecting an interference state between the enterprises to take fault-notification control according to this detected result.

The radio-resource management apparatus in accordance with the present invention is characterized in including control means for, based on radio-link quality information to be notified from at least one of a plurality of radio base stations and radio terminals belonging to respective different operators, taking alteration control of a frequency that said radio base station utilizes.

Another radio-resource management apparatus in accordance with the present invention is characterized in including control means for, based on radio-link quality information to be notified from at least one of a plurality of radio base stations and radio terminals belonging to respective different operators, taking transmitted-power control for said radio base station.

Yet another radio-resource management apparatus in accordance with the present invention is characterized in including control means for, based on radio-link quality information to be notified from at least one of a plurality of radio base stations and radio terminals belonging to respective different operators, taking distribution control of a load that is a radio terminal to be accommodated in said radio base station.

An additional radio-resource management apparatus in accordance with the present invention is characterized in including control means for, based on radio-link quality information to be notified from at least one of a plurality of radio base stations and radio terminals belonging to respective different operators, detecting an interference state between the enterprises to take fault-notification control according to this detected result.

The radio base station in accordance with the present invention, which is a radio base station in a wireless network system including a radio-resource management apparatus for managing a radio resource, and radio base stations belonging to a plurality of respective different radio operators, is characterized in including the means for: measuring a quality of a radio link to notify radio-link quality information that is this measured result to said radio-resource management apparatus; and in reply to alteration-control notification of a frequency based on said measured result from said radio-resource management apparatus, taking alteration control of a service frequency.

Another radio base station in accordance with the present invention, which is a radio base station in a wireless network system including a radio-resource management apparatus for managing a radio resource, and radio base stations belonging to a plurality of respective different radio operators, is characterized in including the means for: measuring a quality of a radio link to notify radio-link quality information that is this measured result to said radio-resource management apparatus; and in reply to transmitted-power control based on said measured result from said radio-resource management apparatus, taking alteration control of transmitted power.

The radio terminal in accordance with the present invention, which is a radio terminal in a wireless network system including a radio-resource management apparatus for managing a radio resource, and radio base stations belonging to a plurality of respective different radio operators, is characterized in including the means for: measuring a quality of a radio link to notify radio-link quality information that is this measured result to said radio-resource management apparatus; and in reply to alteration-control notification of a frequency based on said measured result from said radio-resource management apparatus, taking alteration control of a service frequency.

Another radio terminal in accordance with the present invention, which is a radio terminal in a wireless network system including a radio-resource management apparatus for managing a radio resource, and radio base stations belonging to a plurality of respective different radio operators, is characterized in including the means for: measuring a quality of a radio link to notify radio-link quality information that is this measured result to said radio-resource management apparatus; and in reply to transmitted-power control based on said measured result from said radio-resource management apparatus, taking alteration control of transmitted power.

Yet another radio terminal in accordance with the present invention, which is a radio terminal in a wireless network system including a radio-resource management apparatus for managing a radio resource, and radio base stations belonging to a plurality of respective different radio operators, is characterized in including: means for measuring a quality of a radio link to notify radio-link quality information that is this measured result to said radio-resource management apparatus; and base-station alteration control means for, in reply to distribution control of a connected radio terminal based on said measured result from said radio-resource management apparatus, taking alteration control of a connected base station.

The program in accordance with the present invention, which is a program for causing a computer to execute a control operation of a radio-resource management apparatus in a wireless network system, is characterized in including a frequency control step of, based on radio-link quality information to be notified from at least one of radio base stations and radio terminals belonging to respective different operators, taking alteration control of a frequency that said radio base station utilizes.

Another program in accordance with the present invention, which is a program for causing a computer to execute a control operation of a radio-resource management apparatus in a wireless network system, is characterized in including a transmitted-power control step of, based on radio-link quality information to be notified from at least one of radio base stations and radio terminals belonging to respective different operators, taking transmitted-power control for said radio base station.

Yet another program in accordance with the present invention, which is a program for causing a computer to execute a control operation of a radio-resource management apparatus in a wireless network system, is characterized in including a load-distribution control step of, based on radio-link quality information to be notified from at least one of radio base stations and radio terminals belonging to respective different operators, taking load-distribution control of a load that is a radio terminal to be connected to said radio base station.

An additional program in accordance with the present invention, which is a program for causing a computer to execute a control operation of a radio-resource management apparatus in a wireless network system, is characterized in including a step of, based on radio-link quality information to be notified from at least one of radio base stations and radio terminals belonging to respective different operators, making notification of occurrence of a fault and the interference quantity, the transmitted-power quantity that the radio base station should attenuate, and the frequency that the radio base station should alter to a network management server of the radio operator that is an interference source in the event that radio interference having a pre-specified value or more from the other radio operator was detected within a network of a certain radio operator.

A further additional program in accordance with the present invention, which is a program for causing a computer to execute a control operation of a radio base station in a wireless network system including a radio-resource management apparatus for managing a radio resource, and radio base stations belonging to a plurality of respective different radio operators, is characterized in including the steps of: measuring a quality of a radio link to notify radio-link quality information that is this measured result to said radio-resource management apparatus; and in reply to alteration-control notification of a frequency based on said measured result from said radio-resource management apparatus, taking alteration control of a service frequency.

Another program in accordance with the present invention, which is a program for causing a computer to execute a control operation of a radio base station in a wireless network system including a radio-resource management apparatus for managing a radio resource, and radio base stations belonging to a plurality of respective different radio operators, is characterized in including the steps of: measuring a quality of a radio link to notify radio-link quality information that is this measured result to said radio-resource management apparatus; and in reply to transmitted-power control based on said measured result from said radio-resource management apparatus, taking alteration control of transmitted power.

Another program in accordance with the present invention, which is a program for causing a computer to execute a control operation of a radio terminal in a wireless network system including a radio-resource management apparatus for managing a radio resource, and radio base stations belonging to a plurality of respective different radio operators, is characterized in including the steps of: measuring a quality of a radio link to notify radio-link quality information that is this measured result to said radio-resource management apparatus; and in reply to alteration-control notification of a frequency based on said measured result from said radio-resource management apparatus, taking alteration control of a service frequency.

Another program in accordance with the present invention, which is a program for causing a computer to execute a control operation of a radio terminal in a wireless network system including a radio-resource management apparatus for managing a radio resource, and radio base stations belonging to a plurality of respective different radio operators, is characterized in including the steps of: measuring a quality of a radio link to notify radio-link quality information that is this measured result to said radio-resource management apparatus; and in reply to transmitted-power control based on said measured result from said radio-resource management apparatus, taking alteration control of transmitted power.

Another program in accordance with the present invention, which is a program for causing a computer to execute a control operation of a radio terminal in a wireless network system including a radio-resource management apparatus for managing a radio resource, and radio base stations belonging to a plurality of respective different radio operators, is characterized in including the steps of: measuring a quality of a radio link to notify radio-link quality information that is this measured result to said radio-resource management apparatus; and in reply to distribution control of a connected radio terminal based on said measured result from said radio-resource management apparatus, taking alteration control of a connected base station.

The radio-resource management system in accordance with the present invention is characterized in including: means for collecting a link quality, a link availability ratio, and a link communication speed of a radio link from at least one of radio base stations and radio terminals belonging to a plurality of respective different operators; and price decision means for deciding a price at which a communication service via a network of each of said plurality of said operators is offered to an external network responding to these collected results to notify it to said external network.

Another radio-resource management system in accordance with the present invention, which is a radio-resource management system including a radio-resource management server that a radio-resource manager possesses, and radio facilities of a radio communication operator that made a management contract with this radio-resource manager, is characterized in that said radio-resource management server includes: fault process means for supervising a communication status of said radio communication operator to perform a fault process for said radio resource in reply to occurrence of a fault; and fee charging means for charging a management service fee of said radio resource to said radio communication operator.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
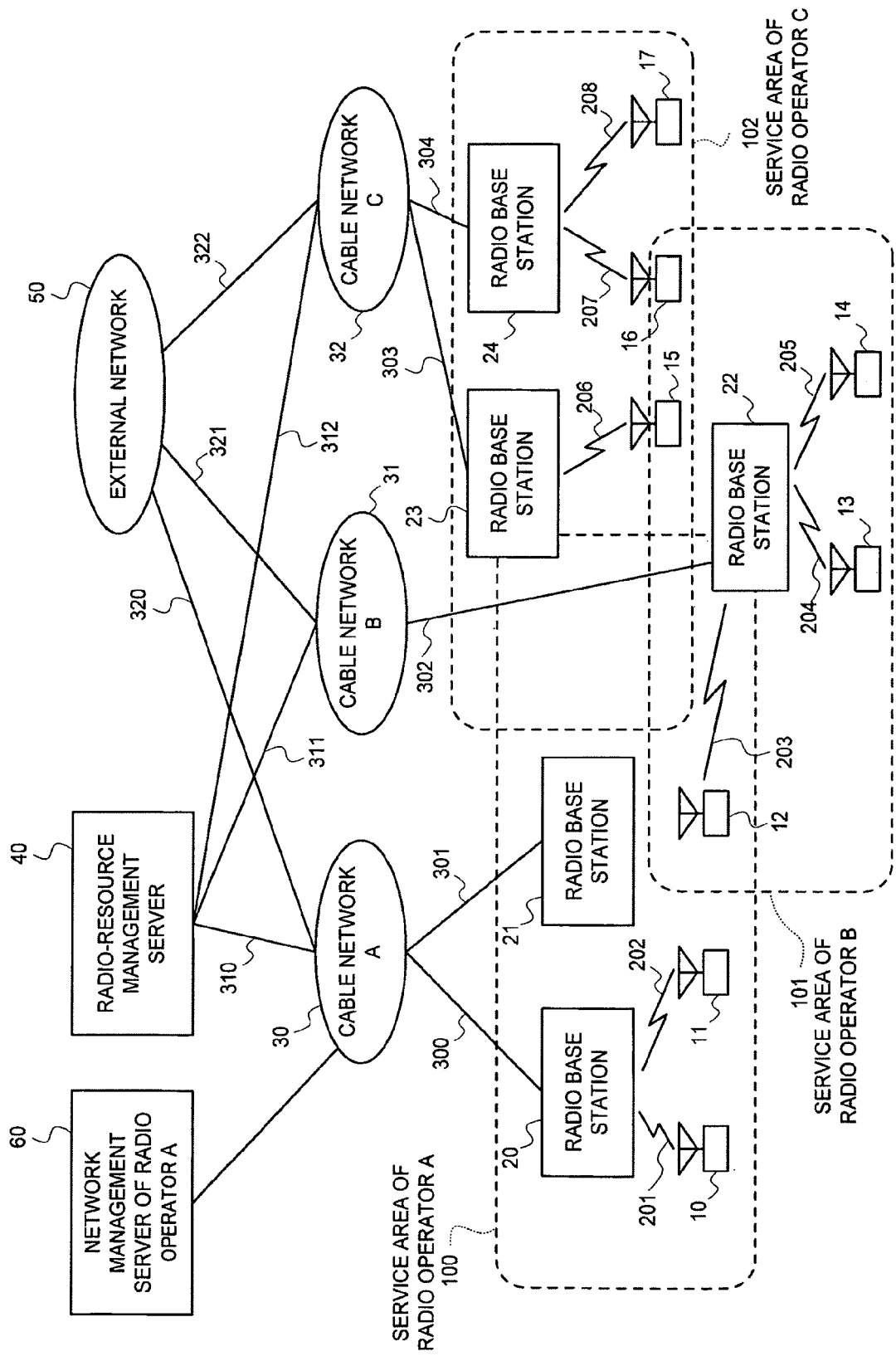
FIG. 1 is a configuration diagram of the radio-resource management system in the first embodiment of the present invention.

Hereinafter, embodiments of the present invention will be explained in details by referring to the accompanied drawings. In FIG. 1 is shown a configuration of the radio-resource management system in a first embodiment of the present invention. A service area 100 of a radio operator A, a service area 101 of a radio operator B, and a service area 102 of a radio operator C exist in a partially-overlapped state, and a radio-resource management server 40 manages the radio resource in a unified manner that these three operators hold in common. Herein, assume that each of the operators mutually makes a contract for roaming with the other so that respective radio terminals can freely roam among these service areas 100 to 102 for continuing communication, and this roaming allows each of the service areas to interpolate the other. Also, each operator may employ the configuration having a network management server for an operator within the network (In FIG. 1, a network management server 60 of the radio operator A is shown as one example).

Radio terminals 10 and 11, which are connected to a radio base station 20, make data communication via radio links 201 and 202 in the service area 100 of the radio operator A. Radio base stations 20 and 21 are connected to a cable network 30 of the radio operator A via cable links 300 and 301 respectively, and further connected to a radio-resource management server 40 and an external network 50 via cable links 310 and 320 respectively.

Radio terminals 12 to 14, which are connected to a radio base station 22, make data communication via radio links 203 to 205 in the service area 101 of the radio operator B. The radio terminal 12 is connectable to both of the radio base station 22 of the radio operator B and the radio base station 21 of the radio operator A; however, herein it is connected to the radio base station 22 of the radio operator B. The radio base station 22 is connected to a cable network 31 of the radio operator B via a cable link 302, and further connected to the radio-resource management server 40 and the external network 50 via cable links 311 and 312 respectively.

A radio terminal 15 that is connected to a radio base station 23, and radio terminals 16 and 17 that are connected to a radio base station 24 make data communication via radio links 206 to 208 respectively in the service area 102 of the radio operator C. The radio terminals 15 and 16 are connectable to both of the radio base station 22 of the radio operator B and the radio base stations 23 and 24 of the radio operator C; however, herein they are connected to the radio base stations 23 and 24 of the radio operator C respectively. The radio base stations 23 and 24 are connected to a cable network 32 of the radio operator C via cable links 303 and 304 respectively, and further connected to the radio-resource management server 40 and the external network 50 via cable links 312 and 322 respectively.

Figure 2:
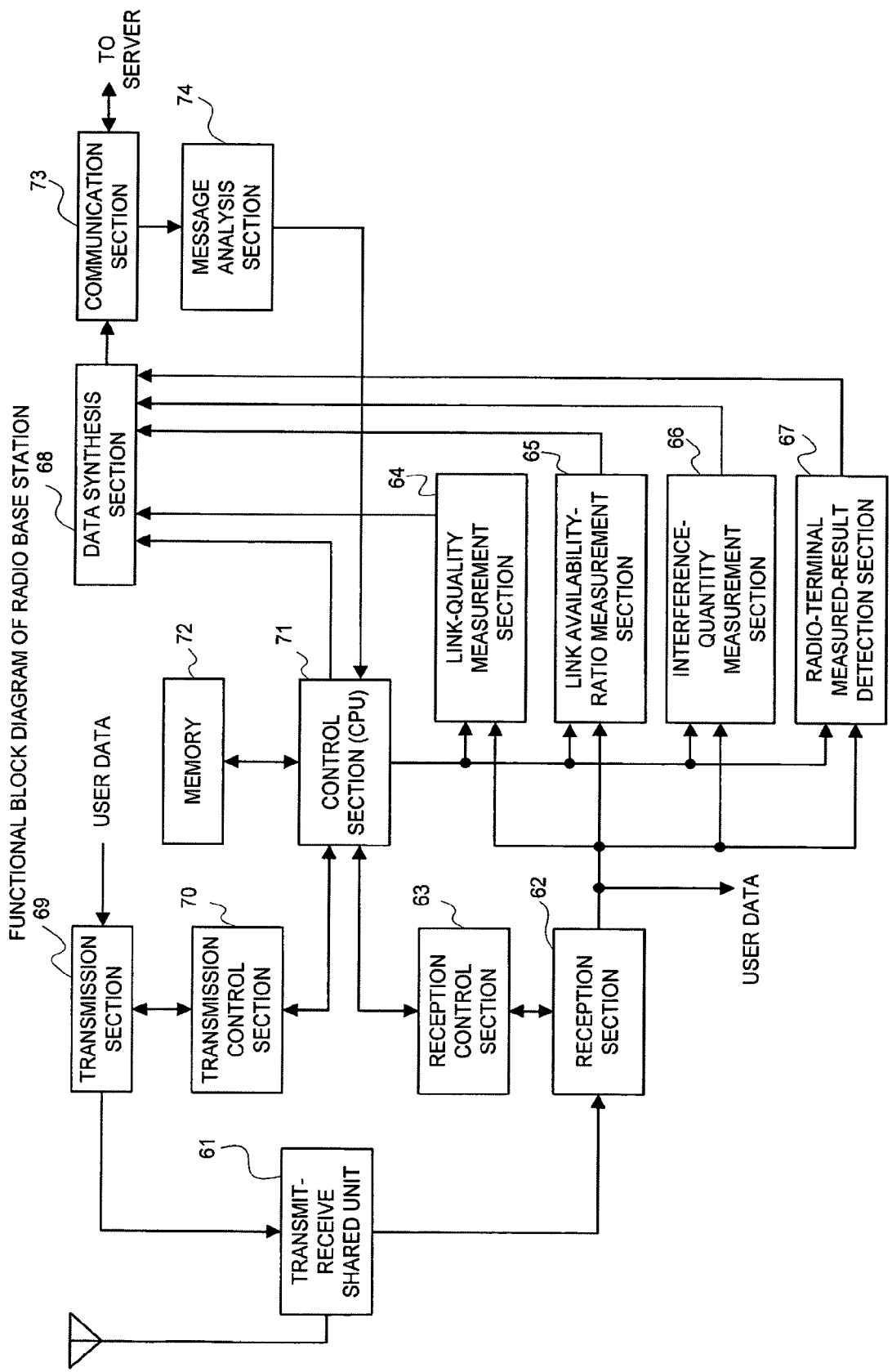
FIG. 2 is a schematic functional block diagram of the radio base station in the first embodiment of the present invention.

FIG. 2 is a schematic functional block diagram of the radio base station, wherein down-direction user data (packet data), for which a transmission process is performed by a transmission section 69, is transmitted to the radio terminal via a transmit-receive shared unit 61 and an antenna. A radio wave received from the antenna is supplied to a reception section 62 through the transmit-receive shared unit 61, and up-direction user data and various kinds of control information including a pilot signal, etc. are derived. The quality and the availability ratio of the radio link are measured by a link-quality measurement section 64 and a link availability-ratio measurement section 65 respectively based on these kinds of the user data and the control information. Also, a neighboring radio base station that becomes an object of notification to the radio-resource management server is decided to measure information relating to the above decided neighboring radio base station in an interference-quantity measurement section 66. As one example of how to decide this, there is a method of deciding it based on the level of the radio wave received from the neighboring radio base station to be later described.

The various kinds of the measured information transmitted from the radio terminal are detected in a radio terminal measured-result detection section 67, and this detected result and the results measured by the link-quality measurement section 64, the link availability-ratio measurement section 65, and the interference-quantity measurement section 66 are synthesized in a data synthesis section 68, and notified as radio-link measured information 600 to the radio-resource management server via a communication section 73. Also, various messages to be obtained from the radio-resource management server via the communication section 73 are analyzed in a message analysis section 74, and this analyzed result is supplied to a control section 71 that is a CPU. The control section 71 controls a reception control section 63 and a transmission control section 70 according to this analyzed result, and performs the process such as frequency-alteration control and transmitted-power control to be later described. In addition, a memory 72 can be a memory for work of the CPU, and can be a memory having an operational control program filed.

Figure 3:
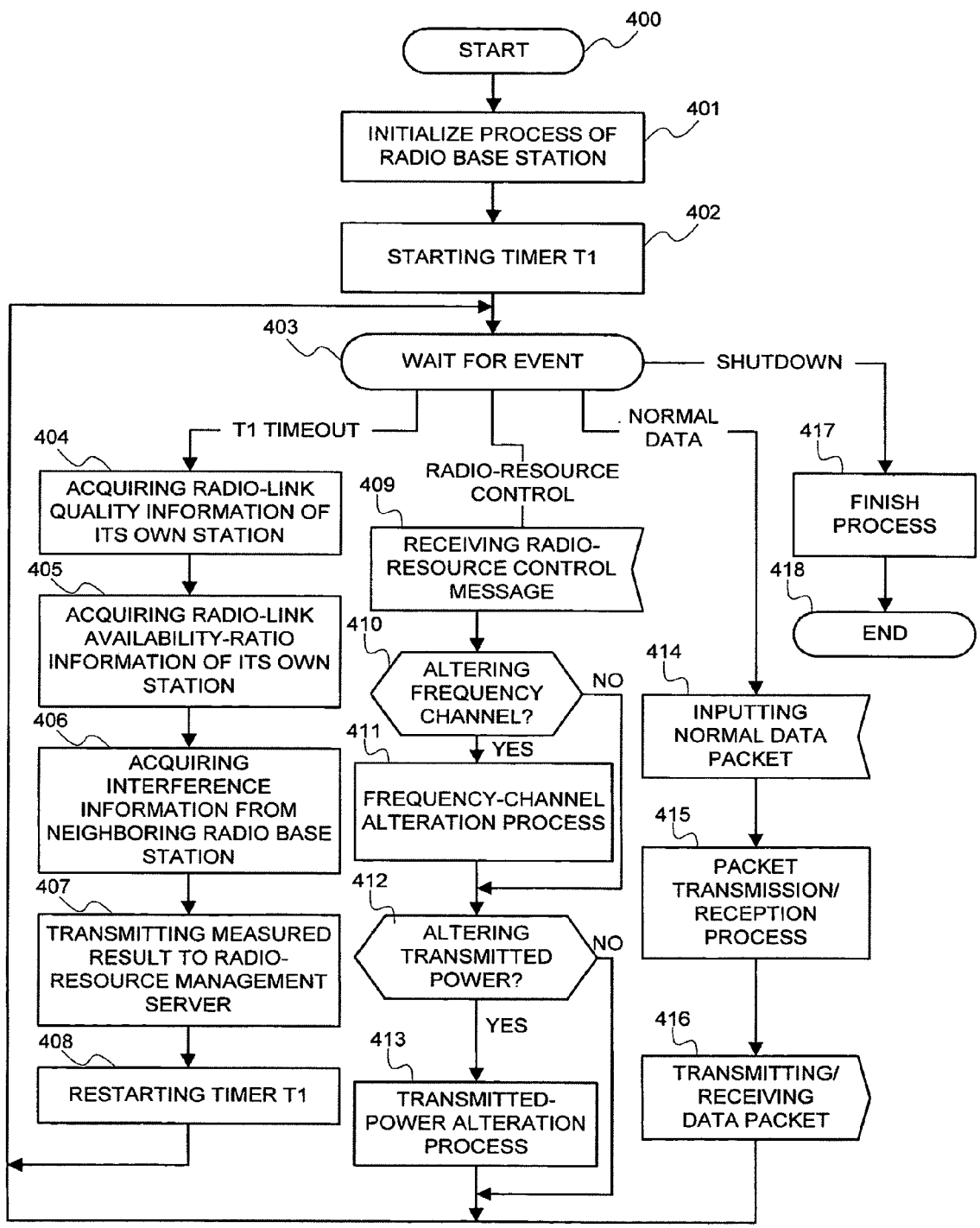
FIG. 3 is an operational flowchart of the radio base station in the first embodiment of the present invention.

In FIG. 3 is illustrated an operational flowchart of the radio base station in a first embodiment of the present invention. At first, the radio base station performs an initialize process after a boot, acquires information such as the frequency channel, the transmitted power, an address of its own station, and an address of the radio-resource management server, and performs various configurations (step 401).

Next, the radio base station starts a timer T1 (step 402), and comes into a wait state of an event (step 403). This timer T1 is for designating a period at which the measured result of the radio link is notified from the radio base station to the radio-resource management server, and its period is a variable value that can be set radio base station by radio base station. After the radio base station acquired radio-link quality information of its own station (step 404), radio-link availability-ratio information (step 405), and interference information from the neighboring radio base station that became an object of notification to the radio-resource management server (step 406) whenever a time-out of T1 occurs, it transmits the measured result to the radio-resource management server (step 407), and then returns to a wait state of an event after restarting the timer T1.

Next, in the event that the radio base station received a radio-resource control message from the radio-resource management server (step 409), it performs a frequency-channel alteration process (step 411) if the control content is a frequency-channel alteration request (step 410), and alters the transmitted power to a designated value (step 413) if it is a transmitted-power alteration request (step 412). Normally, a transfer process of data is independent from these control messages, and a packet transfer process is performed between the cable link and the radio link, and between the radio link and the cable link (steps 414 to 416). Furthermore, at the time of shutting the radio base station down, the process is finished after the finish process was performed (steps 417 and 418).

Figure 4:
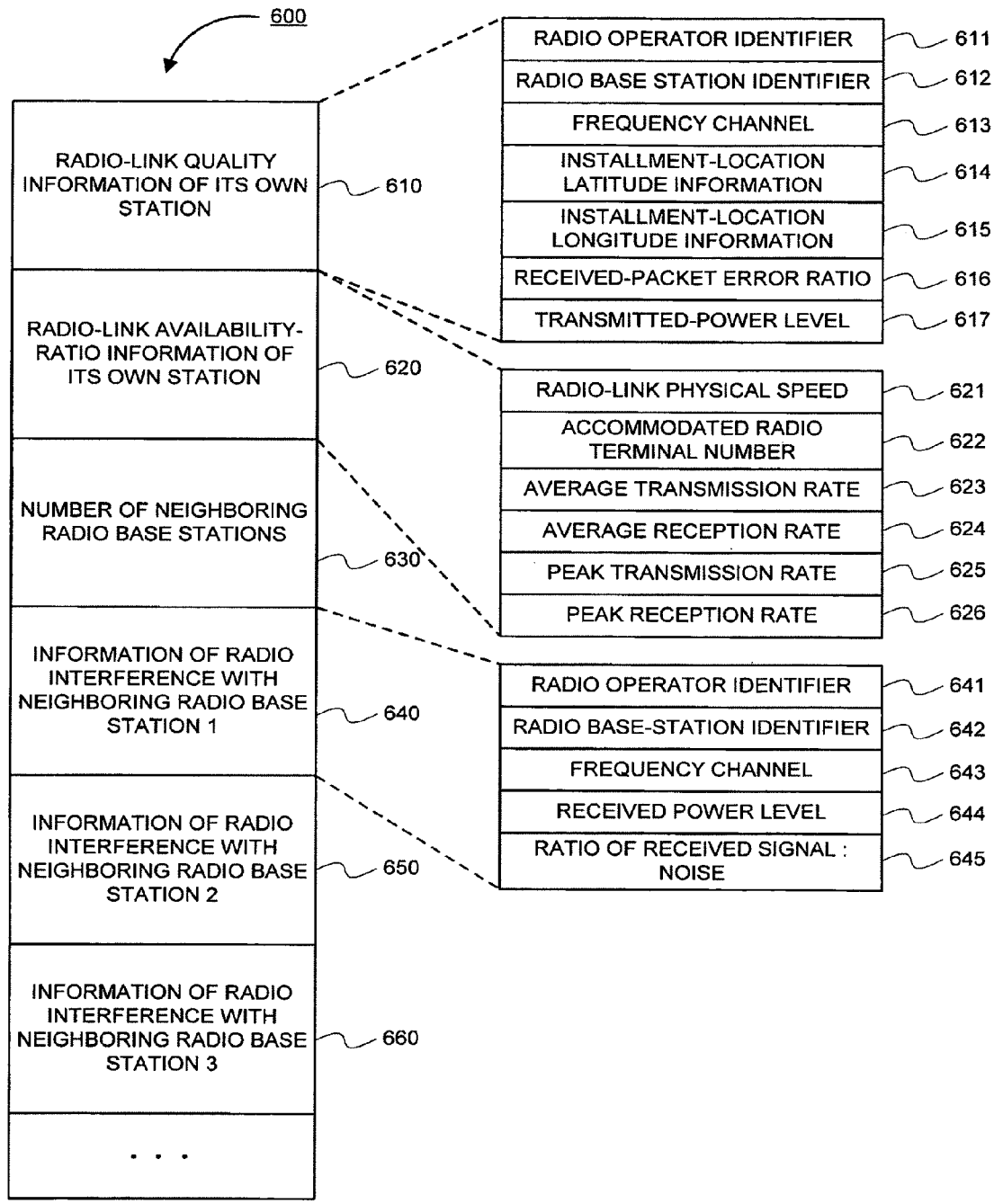
FIG. 4 is a view illustrating contents of the radio-link measured information to be transmitted from the radio base station to the radio-resource management server in the first embodiment of the present invention.

In FIG. 4 is an illustrated content of radio-link measured information 600 to be transmitted from the radio base station to the radio-resource management server in the first embodiment of the present invention. The radio-link measured information 600 is configured of radio-link quality information of its own station 610, radio-link availability-ratio information of its own station 620, a number of a neighboring radio base station 630, and information 640, 650, 660, . . . of radio interference with neighboring radio base stations 1, 2, 3, . . . . These kinds of the radio-link quality information, the radio-link availability-ratio information, and the radio interference information can be referred to as radio-link quality information in a mass. That is, this radio-link availability ratio also can be referred to as quality information because there rises congestion, and communication quality deteriorates when the radio-link availability ratio becomes large, and also, needless to say, the interference information falls into a category of the quality information.

In the radio-link quality information of its own station 610 are included a radio operator identifier 611, a radio base-station identifier 612, a frequency channel 613, installment-location latitude information 614, installment-location longitude information 615, a received-packet error ratio 616, and a transmitted-power level 617. For example, in the event of the wireless LAN, Service Set ID (SSID) is employed for the radio operator identifier 611, and an MAC (Media Access Control) address of the radio base station for the radio base-station identifier 612 respectively. The frequency channel 613 is represented by a channel number allocated for each radio system, or the frequency itself thereof is represented in a unit of kHz.

The attitude/longitude information of the installment location is used only in the event that the radio base station has these kinds of information. A Global Positioning System (GPS), a PHS technique, etc. are considered as means for acquiring this attitude/longitude information. Also, it is possible that a person who installs the base station measures it manually. The received-packet error ratio 616 indicates a rate at which a CRC (Cyclic Redundancy Check) error occurred as against the packets received from the radio terminals under the base station during the measurement period, and as to the transmitted-power level, a power level at which the radio base station is transmitting the power toward the radio terminal is represented in a unit of dBm.

In the radio-link availability-ratio information of its own station 620 are included a physical speed of a radio link 621, an accommodated radio terminal number 622, an average transmission rate 623, an average reception rate 624, a peak transmission rate 625, and a peak reception rate 626. The accommodated radio terminal number 622 indicates the number of the radio terminals connected under the above radio base station. The average transmission rate 623 and the average reception rate 624 are average bit rates obtained by dividing the bit number transmitted/received during the measurement period via the radio link by the measurement period, respectively. On the other hand, the peak transmission rate 625 and the peak reception rate 626 indicate the maximum bit numbers transmitted/received for any one second during the measurement period respectively.

A number of a neighboring radio base station 630 indicates the number of the radio base stations to be included in the radio-link measured information 600, out of the other radio base stations that can be detected in the above radio base stations. That is, the other base stations, from which the level of the radio wave received in the above radio base station is equal to or more than a predetermined threshold, are taken as "other radio base stations that can be detected in the above radio base station", and "the number to be included in the radio-link measured information 600" out of the number of these other base stations is a number of the radio base stations from which the received level is equal to or more than a second threshold obtained by setting the threshold of the level received in the above radio base station to be yet higher. By transmitting only information relating to the other radio base stations having the possibility of interfering with its own station to the radio-resource management server, the aim of reducing the traffic quantity to prevent the congestion of the network is realized.

The radio base station may not always notify all the detected information of the other radio base stations to the radio-resource management server. In the information 640 of radio interference with the neighboring radio base station 1 are included a radio operator identifier 641, a radio base-station identifier 642, a frequency channel 643, a received-power level 644, and a ratio of a received signal: noise 645. What this means is the same as the description concerning the radio-link quality information of its own station 610. As a matter of fact, the interference quantity from the other radio base stations is found from the total of the received-power levels from the other stations in the frequency channel identical to that of its own station.

Figure 5:
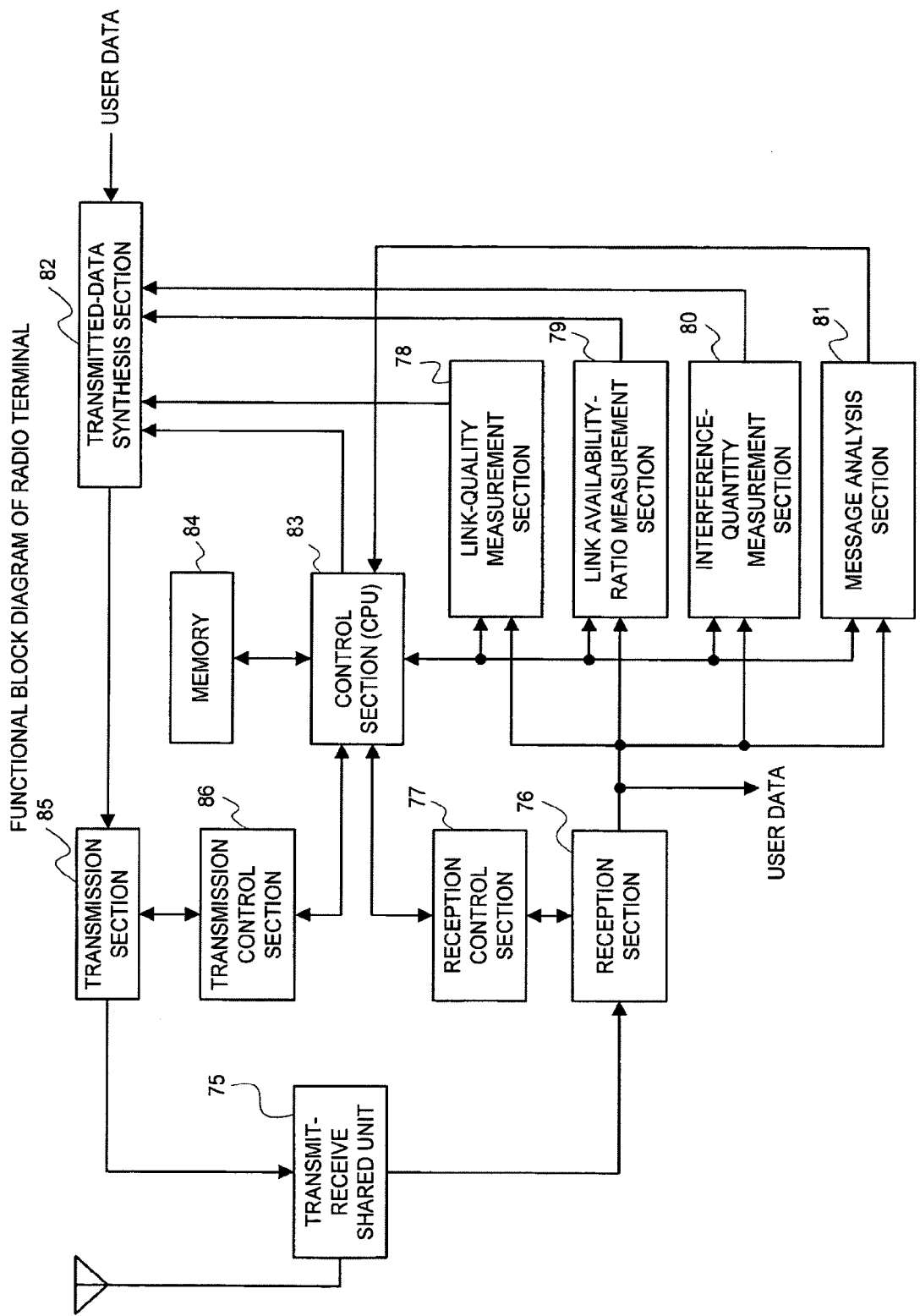
FIG. 5 is a schematic functional block diagram of the radio terminal in the first embodiment of the present invention.

Next, the radio terminal will be explained. FIG. 5 is a schematic functional block diagram of the radio terminal, wherein a down-direction signal received from the antenna is supplied to a reception section 76 via a transmit-receive shared unit 75, and user data and various control signals are derived. These user data and various control signals are input into a link-quality measurement section 78, a link availability-ratio measurement section 79, an interference-quantity measurement section 80, and a message analysis section 81 respectively. The quality of the radio link is measured in the link-quality measurement section 78, the availability ratio of the radio link in the link availability-ratio measurement section 79, and the interference quantity in the interference-quantity measurement section 80, respectively. Also, various messages from the radio-resource management server are analyzed in the message analysis section 81. As the case may be, the above messages are transmitted via the radio base station.

A control section 83 that is a CPU takes various kinds of control for a reception control section 77 and a transmission control section 86, i.e. frequency-alteration control, transmitted-power control, base-station alteration control, etc. in according to the analyzed result of this message. The foregoing various kinds of measured information are synthesized with up-direction user data by a transmitted-data synthesis section 82, and is supplied to a transmission section 85. The synthesized information for which the transmission process is performed by this transmission section 85 is transmitted in the up direction via the transmit-receive shared unit 75. In addition, a memory 84 also can be a memory for work of the CPU 83, and can be a memory having a control program of the above radio terminal filed.

Figure 6:
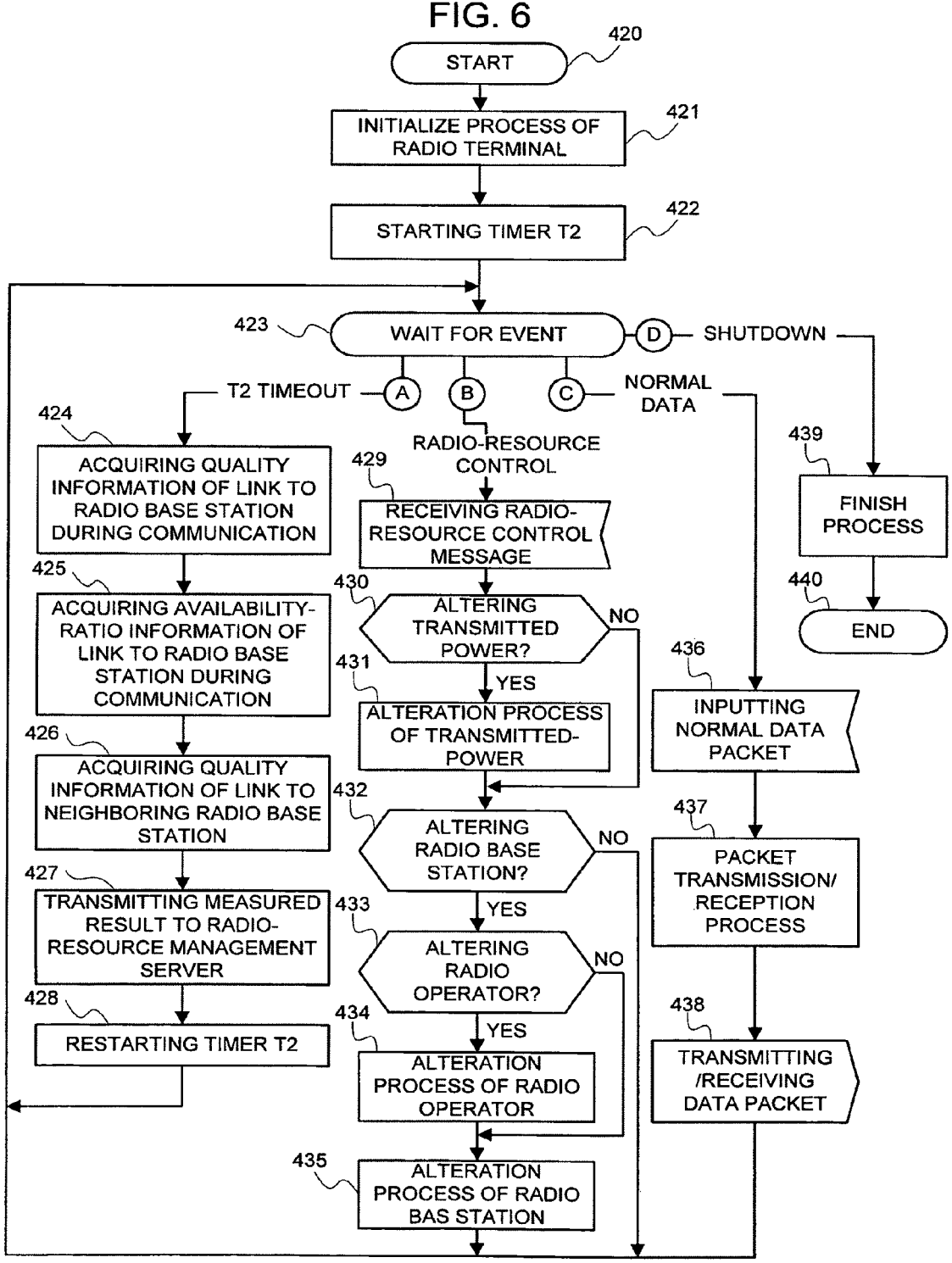
FIG. 6 is an operational flowchart of the radio terminal in the first embodiment of the present invention.

FIG. 6 is a flowchart illustrating an operation of the radio terminal in the first embodiment of the present invention. The radio terminal performs an initialize process after a boot, sets the frequency channel and the transmitted power for connecting to the neighboring radio base station, and acquires an address of its own station and an address of the radio-resource management server, etc. for performing various configurations (step 421). Next, the radio terminal starts a timer T2 (step 422), and comes into a wait state of an event (step 423). A value of this timer T2 decides the period at which the measured result of the radio link is notified from the radio terminal to the radio-resource management server.

After the radio terminal acquired the quality information of the radio link to the radio base station during communication (step 424), the availability-ratio information of the radio link to the radio base station during communication (step 425), and the quality information (interference information) of the link to the neighboring radio base station (step 426) whenever a time-out of T2 occurs, it transmits the measured result to the radio-resource management server (step 427), and then returns to a wait state of an event after restarting the timer T2 (step 428).

Next, in the event that the radio terminal received the radio-resource control message from the radio-resource management server (step 429), it alters the transmitted power to a designated value (step 431) if the control contents is a transmitted-power alteration request (step 430), and it makes handover to the designated radio base station (step 435) if the control contents is a radio base-station alteration request (step 432). At this time, in the event that the radio-resource control message requires a roaming that extends over the radio operators (step 433), it performs a radio operators alteration process such as authentication responding to a necessity (step 434). In the event that normal data was input into the radio terminal, the transmission/reception process is performed for the packet (steps 436 to 438), and in the event that the shutdown process was initiated, the process is finished after the finish process was performed (steps 439 and 440).

Figure 7:
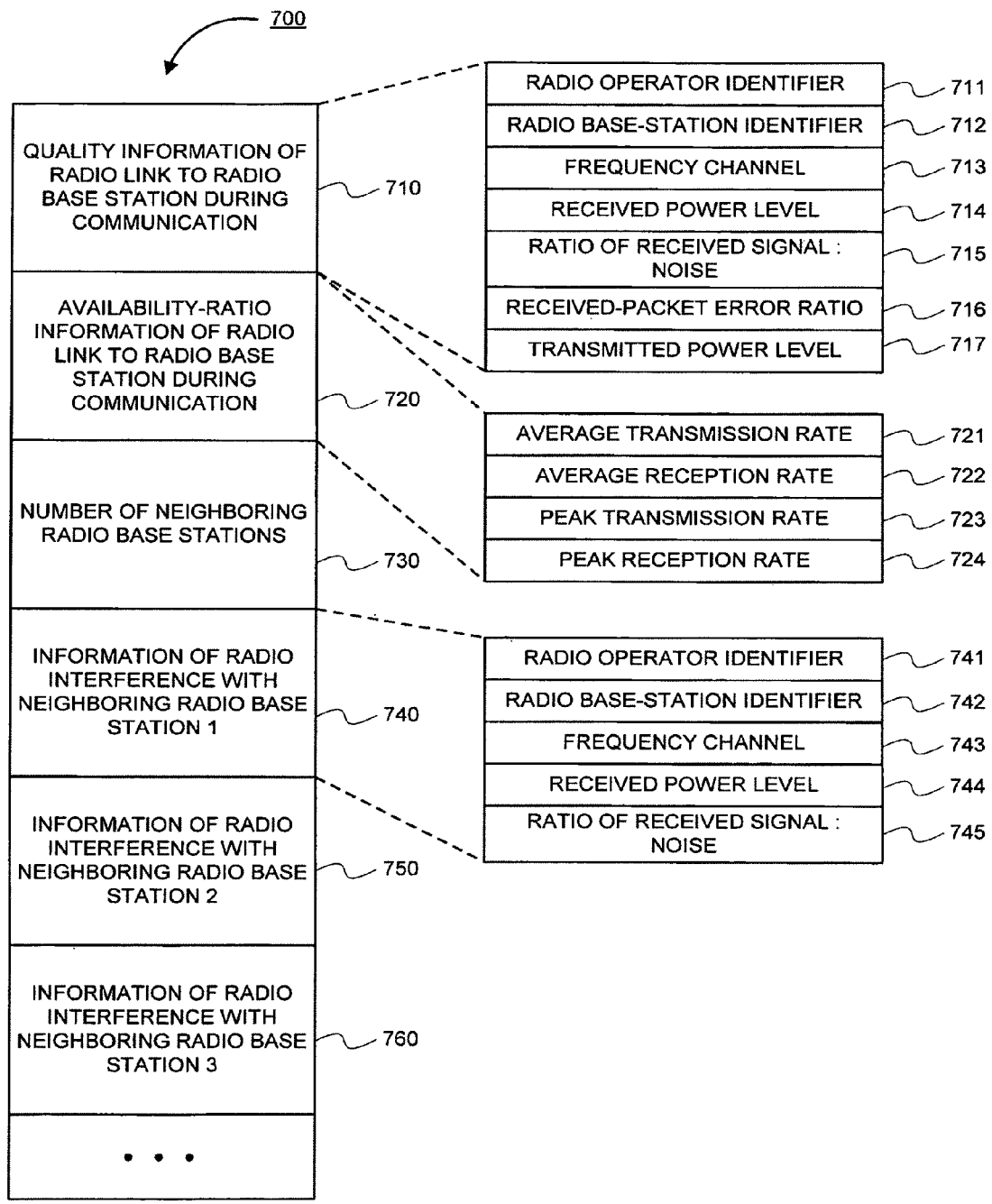
FIG. 7 is a view illustrating contents of the radio-link measured information to be transmitted from the radio terminal to the radio-resource management server in the first embodiment of the present invention.

FIG. 7 is a view illustrating contents of radio-link measured information 700 to be transmitted from the radio terminal to the radio-resource management server in the first embodiment of the present invention. The radio-link measured information 700 is configured of quality information of a radio link to a radio base station during communication 710, availability-ratio information of a radio link to a radio base station during communication 720, a number of a neighboring base station 730, and quality information 740, 750, 760, . . . of radio interference with neighboring radio base stations 1, 2, 3, . . . .

The quality information of a radio link to a radio base station during communication 710 is configured of a radio operator identifier 711, a radio base-station identifier 712, a frequency channel 713, a received-power level 714, a ratio of a received-signal: noise 715, a received-packet error ratio 716, and a transmitted-power level 717. In the availability-ratio information of a radio link to a radio base station during communication 720 are included an average transmission rate 721, an average reception rate 722, a peak transmission rate 723, and a peak reception rate 724.

Also, in the quality information 740 of radio interference with the neighboring radio base station 1 are included a radio operator identifier 741, a radio base-station identifier 742, a frequency channel 743, a received-power level 744, and a ratio of a received-signal: noise 745. The meaning that this notification information has is the same as the explanation of FIG. 4.

The radio-link measured information 700 shown in FIG. 7 to be transmitted from the radio terminal to the radio-resource management server and the radio-link measured information 600 shown in FIG. 4 to be transmitted from the radio base station to the radio-resource management server have the partially duplicated part such as the numbers of the neighboring radio base station 630 and 730, and the frequency channels 613 and 713.

Also, upon taking the total sum of the availability-ratio information of a radio link to a radio base station during communication 720 collected from each radio terminal radio base station by radio base station, its value is due to be equal to the radio-link availability-ratio information of its own station 620 that the radio base station measured. Furthermore, information of radio interference with a neighboring radio base station 640 to 660 that the radio base station measured also can be estimated to a certain extent from information of interference with a neighboring radio base station 740 to 760 that the radio terminal measured. For example, by assuming that the radio terminals are uniformly distributed in the adjacent area of the radio base station to average the levels received from the neighboring radio base stations that a plurality of the radio terminals measured, it is possible to estimate the interference quantity from the neighboring radio base station that the radio base station to which the radio terminal belongs receives.

The reason why the radio-link measured information to be collected is caused to have redundancy as mentioned above is to realize the operation in a system wherein are mixed the conventional radio base station and radio terminal that have neither radio-link measurement function, nor function of notification to the radio-resource management server as described in this embodiment.

For example, in the event that a radio terminal group having the notification function of the radio-link measured information shown in FIG. 7 exists under the conventional radio base station having no notification function of the radio-link measured information shown in FIG. 4, the radio-resource management server can estimate the radio-link quality and the availability ratio by radio base station, and the degree of the interference with the other radio base station from the radio-link measured information 700 collected by the above radio terminal group. Also, conversely, in the event that the conventional radio terminal having no notification function of the radio-link measured information shown in FIG. 7 exists under the radio base station having the notification function of the radio-link measured information shown in FIG. 4, the frequency alteration process, the transmitted-power control process, and the load-distribution control process can be executed in the radio-resource management server, based on the radio-link measured information collected mainly from the radio base station.

In addition, a communication protocol is optional for transmitting the radio-link measured information 600 and 700 from the radio base station or the radio terminal to the radio-resource management server. For example, as a protocol suitable for transmitting such network management information, there is an SNMP (Simple Network Management Protocol, RFC 2570-2576). Also, the transmission of the measured information 700 from the radio terminal to the radio-resource management server may be performed via the radio base station or may be performed without going through it. In the event of transmitting the measured information 700 via the radio base station, by getting the measured information 700 together in the radio base station from the radio terminals that are subordinates thereof to transmit it to the radio-resource management server, efficiency can be realized.

Figure 8:
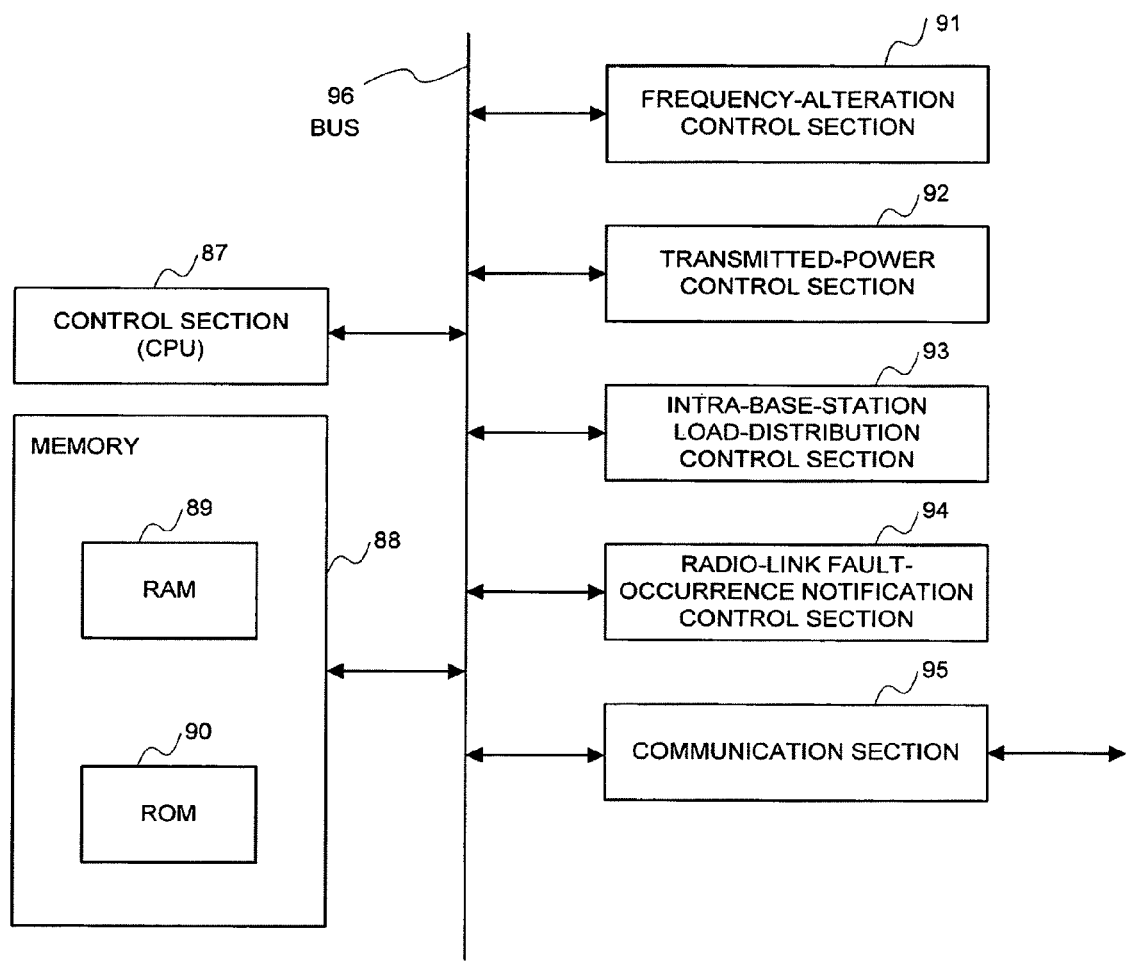
FIG. 8 is a schematic functional block diagram of the radio-resource management server in the first embodiment of the present invention.

FIG. 8 is a schematic functional block diagram of the radio-resource management server. A control section 87 is a CPU that takes control of each section according to a program filed in a ROM 90 of a memory 88. The memory 88 has a RAM 89 that is a memory for work for the CPU 87, and the foregoing ROM 90. A frequency-alteration control section 91 has a function of taking alteration control of the frequency channel for radio base station, and a transmitted-power control section 92 has a function of taking control of the transmitted power for radio base station. Also, an intra-base-station load-distribution control section 93 has a function of taking distribution control of the intra-base-station load, and a radio-link fault-occurrence notification control section 94 controls notification of the fault occurrence to the radio base station. A communication section 95 has a function of making communication with the radio base station and the radio terminal. Each section thereof is connected to a bus 96 in common.

Figure 9:
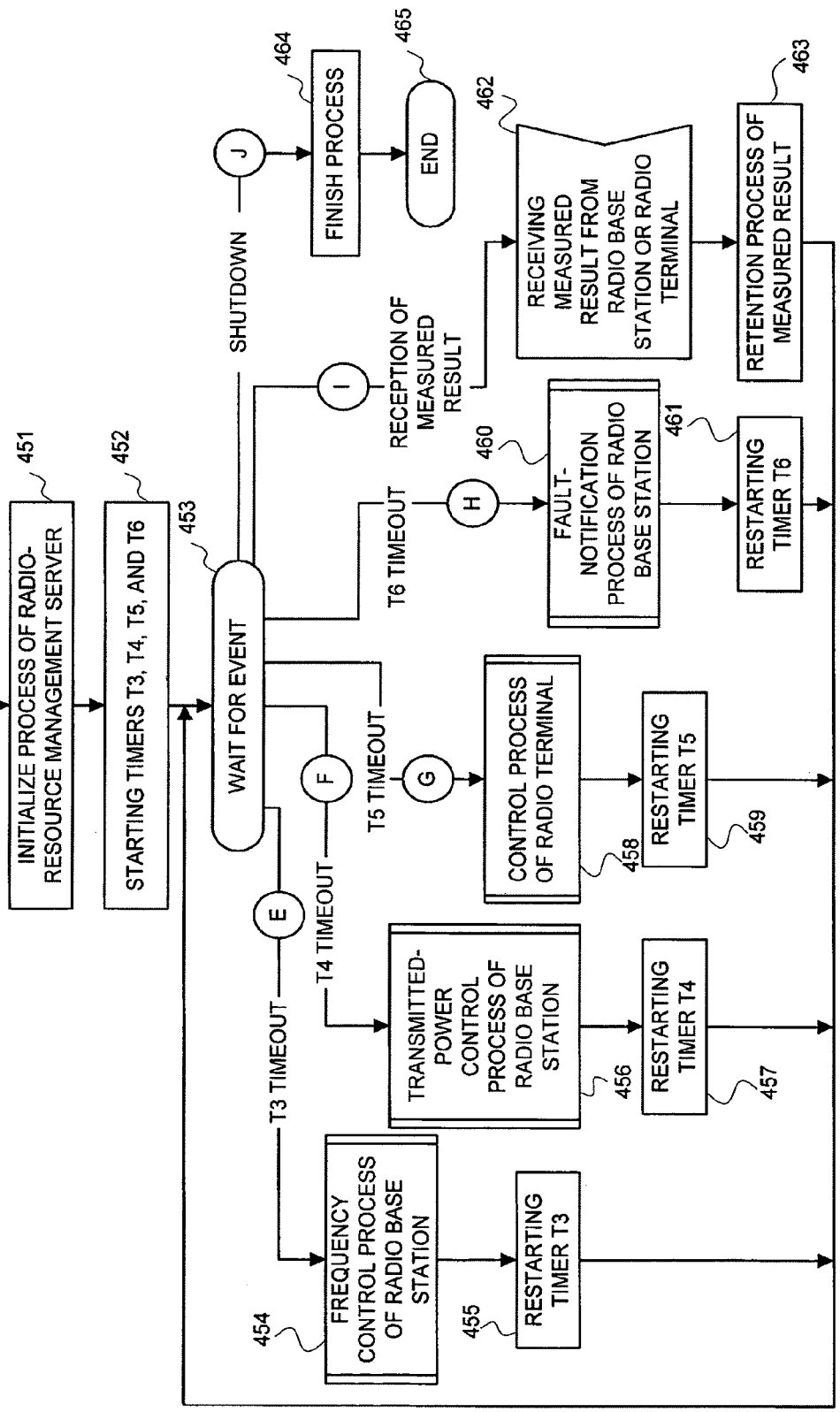
FIG. 9 is an operational flowchart of the radio-resource management server in the first embodiment of the present invention.

In FIG. 9 is illustrated an operational flowchart of the radio-resource management server in the first embodiment of the present invention. After the radio-resource management server performed an initialize process (step 451), and after it started four timers of T3, T4, T5, and T6 (step 452), it comes into a wait state of an event (step 453). T3 designates the period at which the alteration control process (step 454) is performed of the frequency channel of the radio base station. T4 designates the period at which the transmitted-power control process (step 456) is performed for the radio base station. T5 designates the period of control (step 458) for the radio terminal. Also, T6 designates the period at which the fault-notification process (step 460) is performed at the moment that excessive interference was detected from the radio base station.

These processes are performed independently with a time-out of the timers T3 to T6. In addition hereto, in the event that the measured information was received from the radio base station or the radio terminal (step 462), a process for retaining the measured result is performed, and in the event that the shutdown was initiated, a finish process (step 464) is performed.

Figure 10:
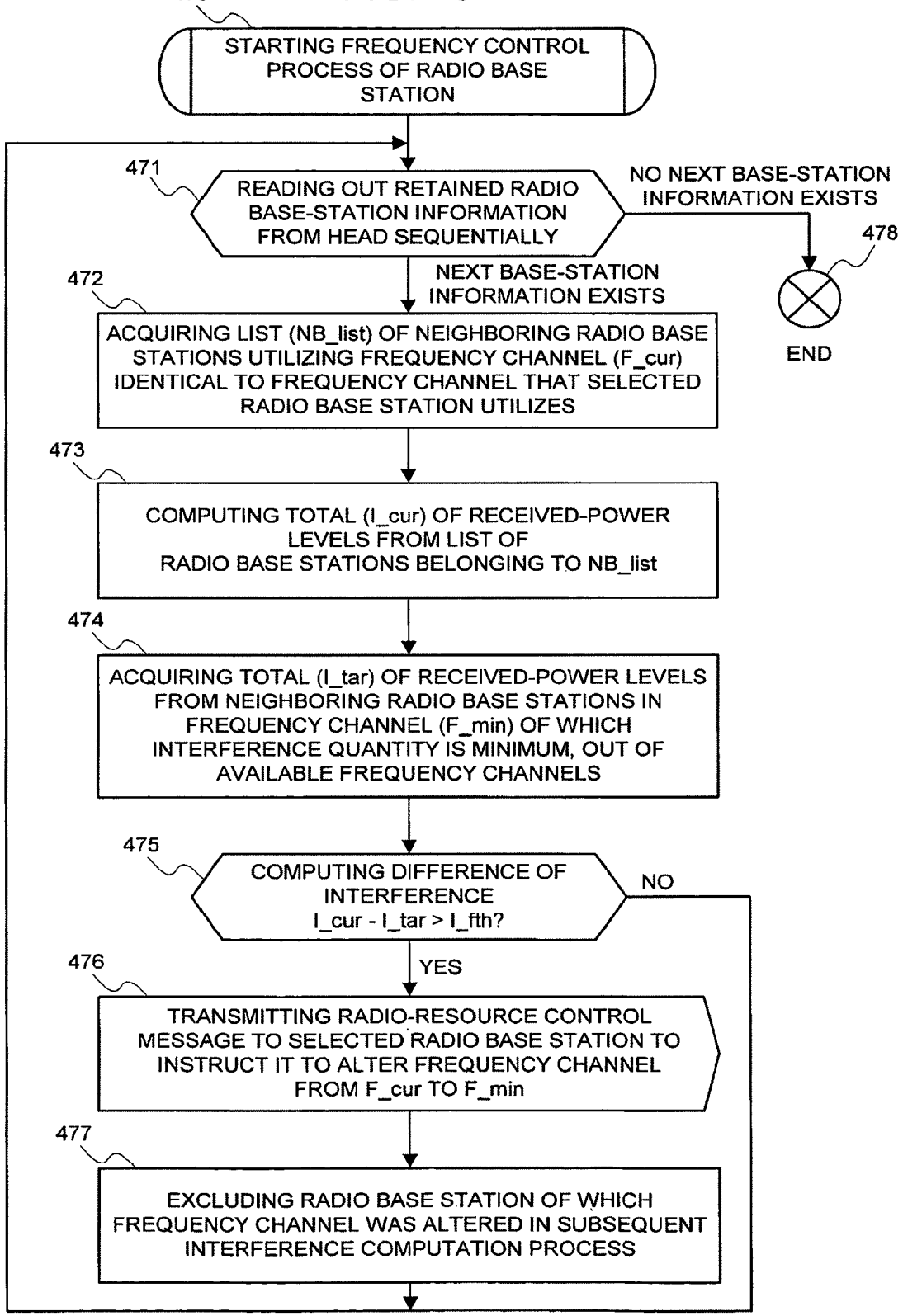
FIG. 10 is an operational flowchart at the moment that the radio-resource management server performs the frequency alteration control for the radio base station in the first embodiment of the present invention.

In FIG. 10 is illustrated an operational flowchart at the moment that the radio-resource management server performs the frequency-alteration control of the radio base station in the first embodiment of the present invention. The radio-resource management server reads out information of the radio base station retained at the moment that the radio-link measured information was received in the order filed from a head radio base station by radio base station (step 471). Next, the radio-resource management server lists the neighboring radio base stations utilizing a frequency channel (F_cur) identical to that of its own station 613 from the read-out information, and acquires a radio base-station list (NB_list) that is composed of these neighboring radio base stations (step 472).

Next, a total (I_cur) is calculated of the received-power levels 644 of the radio base-station group belonging to this radio base-station list (NB_list) (step 473). In addition, the total of this received-power levels is equivalent to the interference quantity. Next, the total of the received-power levels for each of all frequency channels that its own station can utilize is found from the read-out information to assume it to be an interference quantity of its channel. And a total (I_tar) of received-power levels from the neighboring radio base stations is acquired in a frequency channel (F_min) of which the interference quantity is few (step 474).

Herein, in the event that a difference of the interference quantity I_cur-I_tar is larger than a predetermined threshold I_fth (step 475), after the radio-resource management server transmitted the radio-resource control message to the selected radio base station, and instructed it to make the frequency-channel alteration from F_cur to F_min (step 476), it deletes information on the radio base station of which the frequency channel was altered from the memory (step 477). When the radio base-station information that had to be read out ran out, the process is finished (step 478).

As a modified example of the process of the foregoing steps 474 to 476, the following technique also can be considered. That is, in the event that the total of the received-power levels found in the step 473 is larger than the total of received levels of the other radio base stations in the frequency other than the frequency that is currently utilized, out of the frequencies that the selected radio base station can utilize, the means is adapted so as to make an alteration to the frequency other than this frequency that is currently utilized.

Here, the interference not only from the system of the identical radio operator but also from that of the different radio operator is included in the interference quantity (the total of the received-power levels) from the neighboring radio base stations. In performing this frequency alteration process, it is desirable that the value of the timer T3 is set to be significantly long, or that the timer T3 is adapted to be started to the time when the system is hardly utilized because the radio terminals under the radio base station become all incapacitated temporarily. Also, in the above-mentioned explanation, computation of I_cur and I_tar was performed in a radio base-station frequency control process 454 of FIG. 9; however the above computation may be performed in a measured-result retention process 463 at the moment of retaining the measured result.

Figure 11:
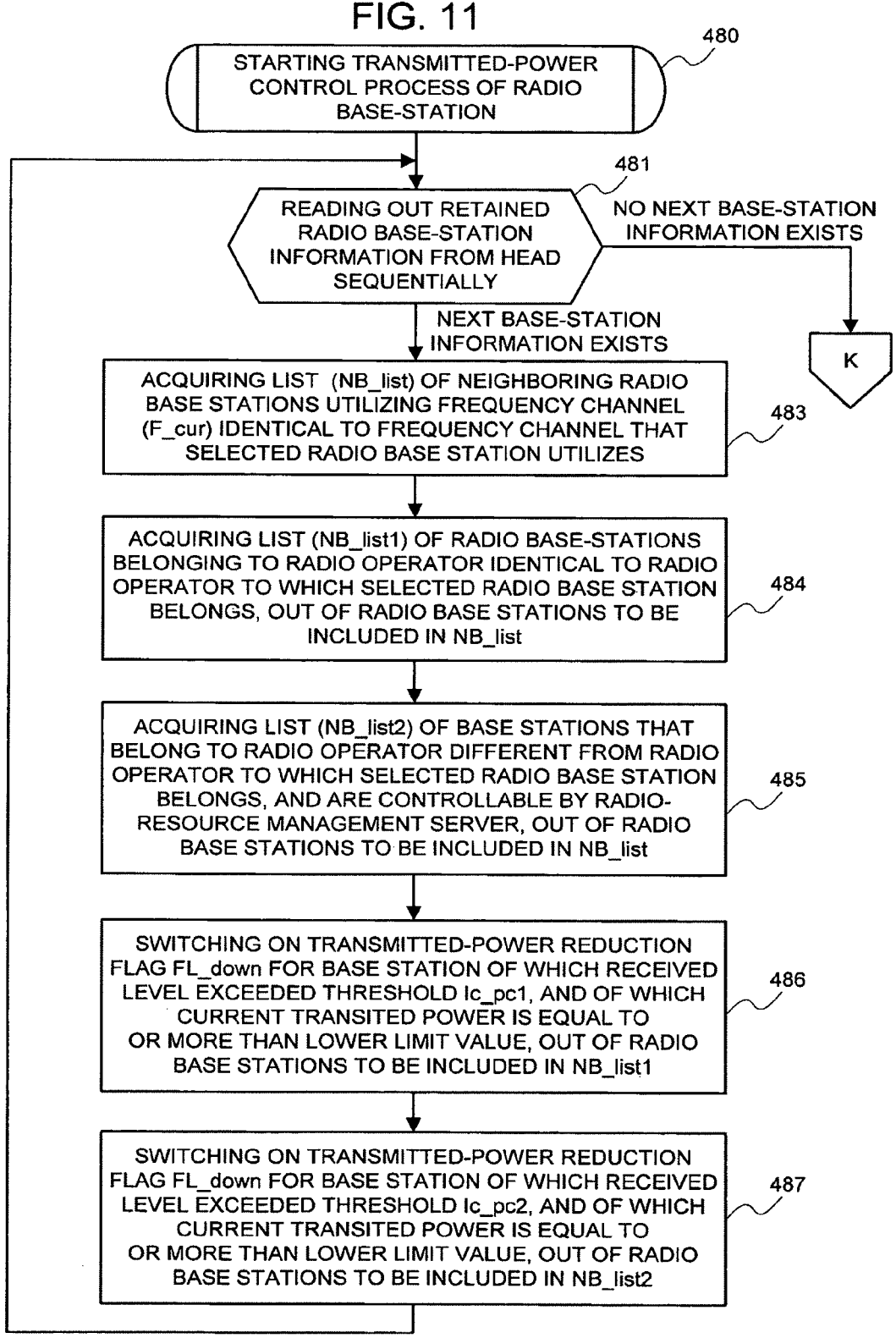
FIG. 11 is an operational flowchart (part 1) at the moment that the radio-resource management server performs the transmitted-power control for the radio base station in the first embodiment of the present invention.
Figure 12:
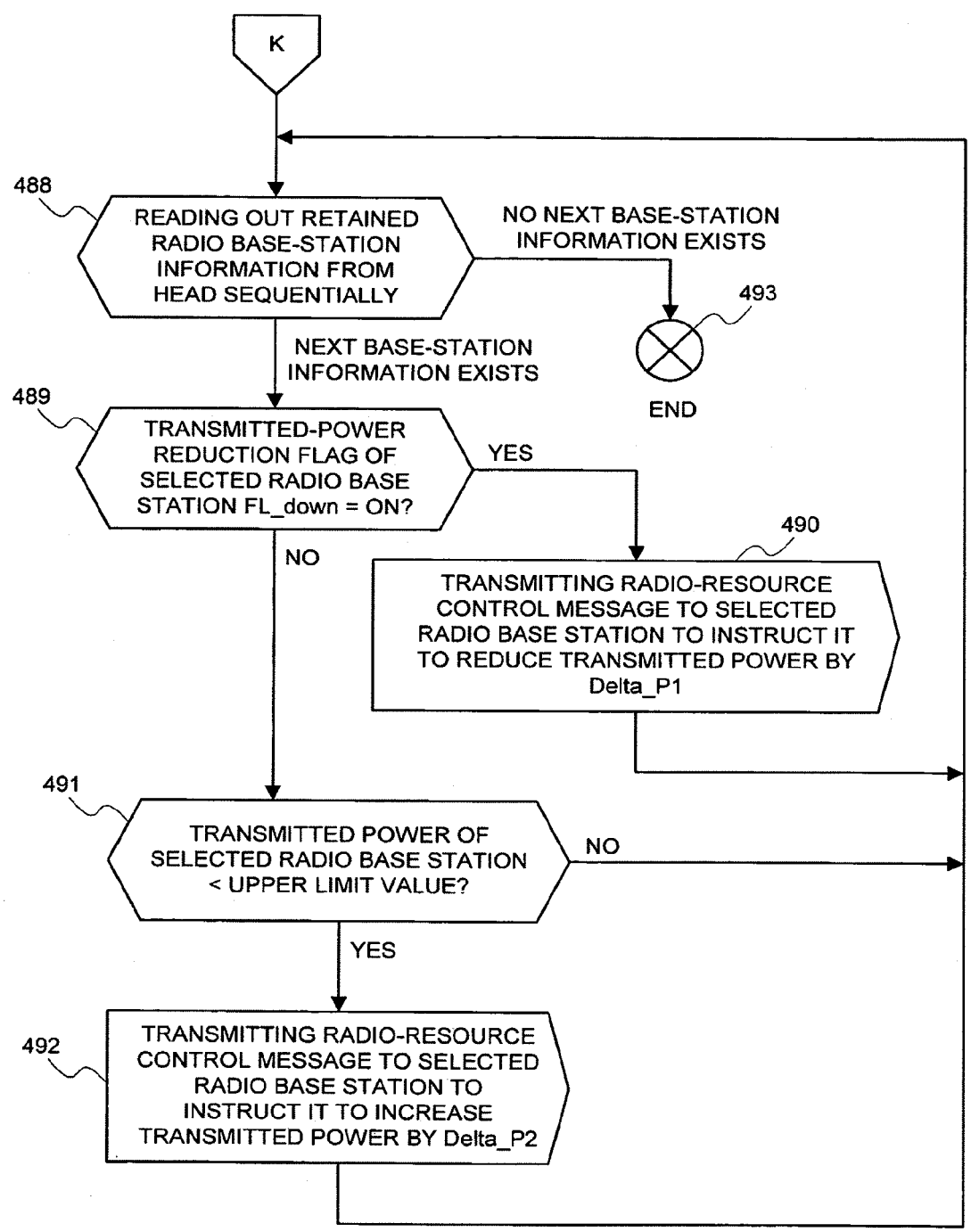
FIG. 12 is an operational flowchart (part 2) at the moment that the radio-resource management server performs the transmitted-power control for the radio base station in the first embodiment of the present invention.

In FIG. 11 and FIG. 12 is illustrated an operational flowchart at the moment that the radio-resource management server performs the transmitted-power control of the radio base station in the first embodiment of the present invention. Also in this case, the radio-resource management server sequentially reads out the radio base-station information from a head radio base station by radio base station (step 481). Next, the radio-resource management server acquires a radio base-station list (NB_list) having the neighboring radio base-station group utilizing a frequency channel (F_cur) identical to the frequency channel that the selected radio base station (its own station) utilizes listed (step 483), acquires a list (NB_list1) indicating the radio base-station group belonging to the radio operator identical to the radio operator to which the selected radio base station belongs, out of the radio base stations to be included in this radio base-station list (NB_list) (step 484), and also, acquires a list (NB_list2) indicating the radio base-station group that belongs to the radio operator different from the radio operator to which the selected radio base station belongs, and yet is controllable by the radio-resource management server (step 485).

The reason why the radio base station is limited to the radio base-station group that is controllable by the radio-resource management server is that it is necessary to use only the result measured by the radio base station that is controllable by the above server because the measured result of the radio link was transmitted to the above server from all radio base stations including the radio base station that is uncontrollable by the above server, and these measured results were all retained within the above server.

Figure 13:
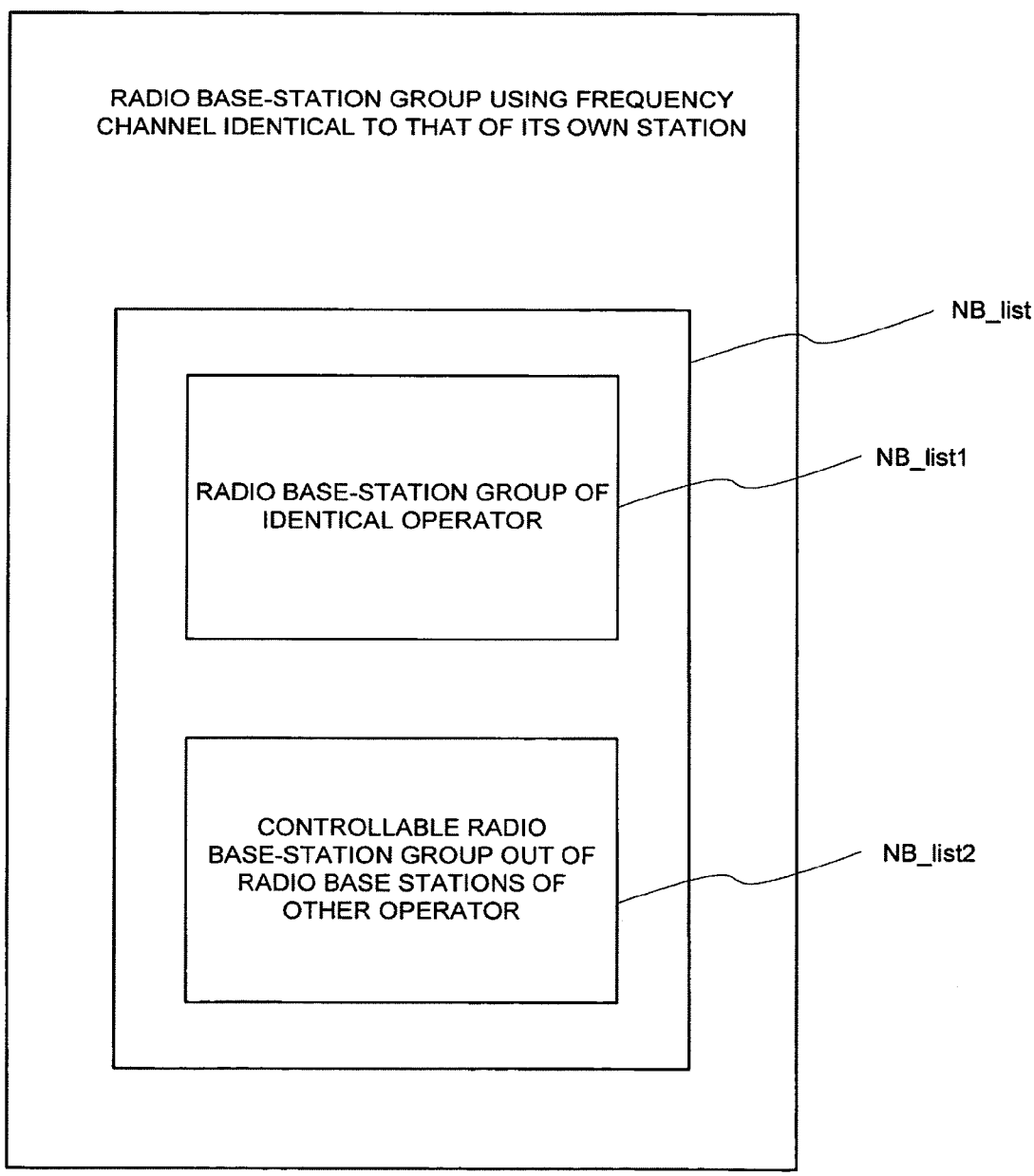
FIG. 13 is a view illustrating each relation of the radio base-station lists (NB_list), (NB_list1), and (NB_list2) in FIG. 10 and FIG. 11.

In addition, a relation of these radio base-station lists (NB_list), (NB_list1), and (NB_list2) mentioned above is illustrated in FIG. 13.

Herein, the radio-resource management server switches on a transmitted-power reduction flag FL_down for the base station, of which the received level exceeded a threshold IC_pc1, and of which the current transmitted power is equal to or more than the lower limit value out of the radio base stations to be included in this radio base-station list (NB_list1) for taking control as as to reduce the interference quantity (step 486). Also, it similarly switches on the transmitted-power reduction flag FL_down for the base station, of which the received level exceeded a threshold Ic_pc2, and of which the current transmitted power is equal to or more than the lower limit value, out of the radio base stations to be included in the list (NB_list2) (step 487).

The reason why the threshold of the interference quantity is sorted out between the identical radio operator and the radio operator other than it is that it is necessary to suppress quantity of the interference with the other radio operator at a lower level than that within the identical radio operator. In such a manner, after the radio base stations of which the level received in the other radio base station exceeded the threshold were all listed, the process proceeds to an actual transmitted-power control process (FIG. 12). The retained radio base-station information is sequentially read out from a head base station by base station (step 488), and if the transmitted-power reduction flag FL_down of the selected radio base station is on (step 489), the radio-resource control message is transmitted to the selected radio base station to instruct it to reduce the transmitted power by Delta_P1 (step 490).

On the other hand, in the event that FL_down was off in the step 489, if the transmitted power of the selected radio base station is equal to or less than the upper limit value (step 491), the radio-resource control message is transmitted to the selected radio base station to instruct it to increase the transmitted power by Delta_P2 (step 492). In such a manner, raising the transmitted power as highly as possible so long as no interference occurs allows a covered range of the network of the radio operator to be spread.

Figure 14:
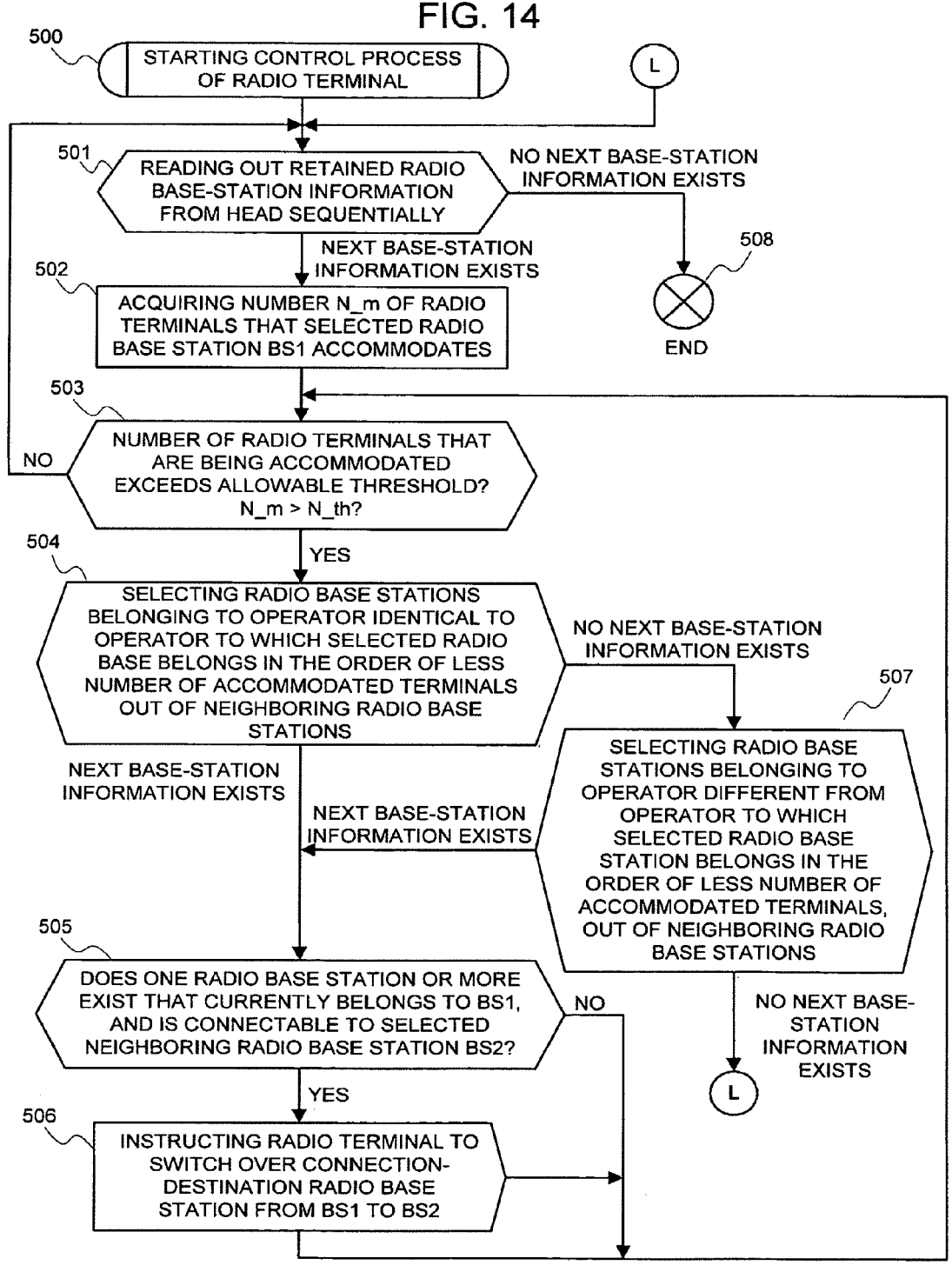
FIG. 14 is an operational flowchart at the moment that the radio-resource management server controls the radio terminal in order to make the load distribution between the radio base stations in the first embodiment of the present invention.

In FIG. 14 is illustrated a flowchart of an operation in which the radio-resource management server gives the radio terminal an instruction of the handover, and makes load distribution between the radio base stations in the first embodiment of the present invention. At first, the radio-resource management server sequentially reads out the retained radio base-station information from a head base station by base station (step 501), and acquires a number N_m of the radio terminals that a selected radio base station BS1 accommodates (step 502). This accommodated radio terminal number N_m is the accommodated radio terminal number 622 in the radio-link measured information 600 shown in FIG. 4.

In the event that the number N_m of the radio terminals that were being accommodated exceeded an allowable threshold (N_th) that is the maximum number of the radio terminals that can be accommodated in a radio base station BS1, i.e. N_m>N_th (step 503), the radio-resource management server selects the radio base stations, which belong to the operator, identical to the operator to which the selected radio base station belongs, in the order of the less number of the accommodated terminals out of the neighboring radio base stations while it makes a reference to the retained information (step 504). Herein, in the event that a radio base station BS2, which is a radio base station of the identical operator, and of which the accommodated terminal number is few, exists in the neighborhood, it is investigated whether one radio terminal or more that currently belongs to BS1 and is connectable to the selected neighboring radio base station BS2 exists (step 505). By making a reference to radio interference information 740, 750, and 760 to be transmitted from the radio terminal, and so forth, this investigation can be made. And, if such a radio terminal exists, this radio terminal is instructed to switch over the connection-destination radio base station from BS1 to BS2 (step 506).

On the other hand, also in the event that no radio base station of the identical operator exists in the neighborhood, and that only the radio base station, which belongs to the different operator and of which the accommodated terminal number is few, exists in the neighborhood, the process is similarly performed (step 507). In such a manner, the load distribution can be made from the network side in the event that the load (the connected radio terminal number) is greatly biased between the identical operator and the different operator.

Figure 15:
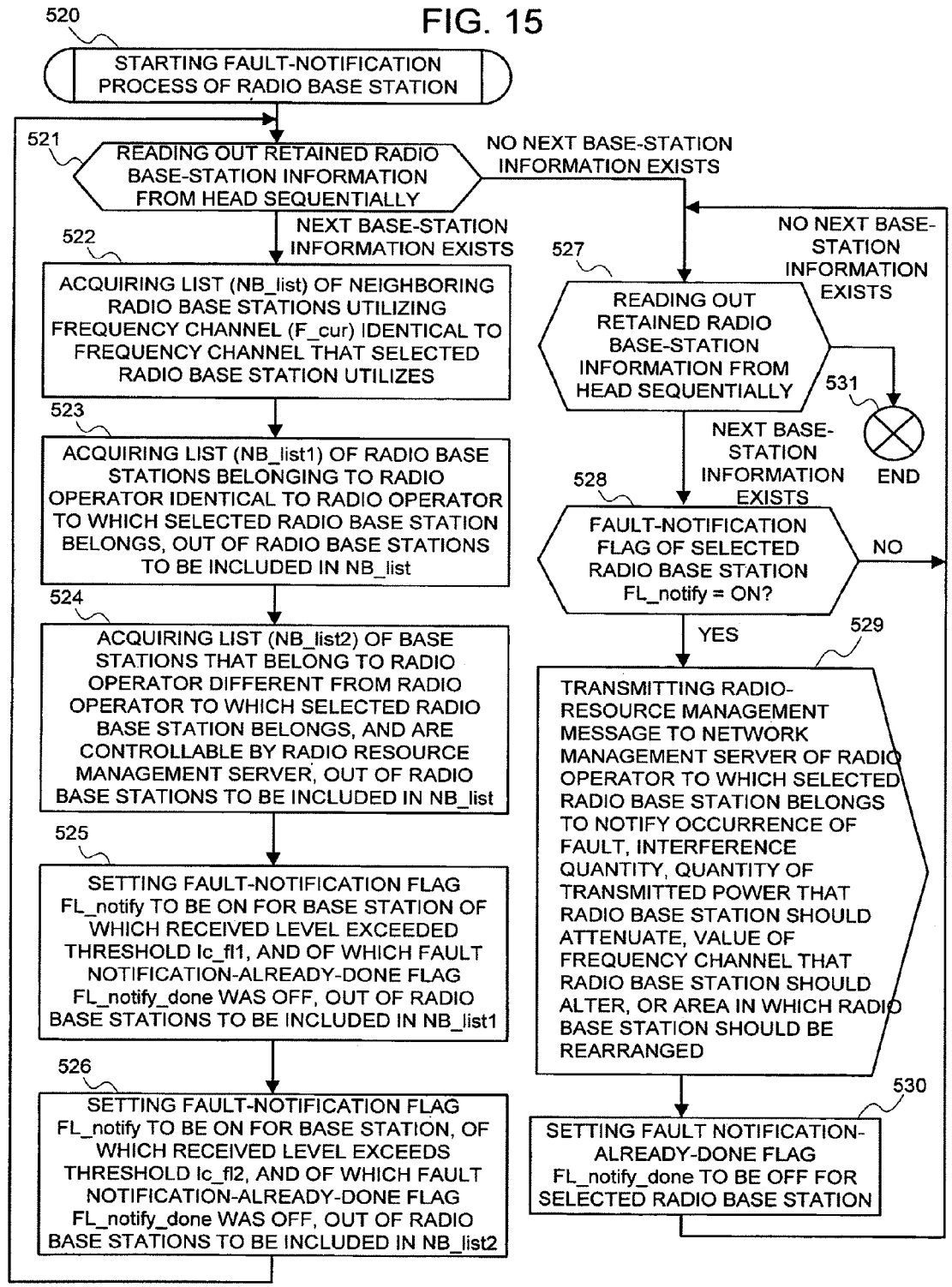
FIG. 15 is an operational flowchart at the moment that the radio-resource management server notifies the occurrence of the fault in the radio link to the network management server in the first embodiment of the present invention.

In FIG. 15 is illustrated an operational flowchart at the moment that the radio-resource management server notifies the occurrence of the fault in the radio link to a network management server in the first embodiment of the present invention. At first, the radio-resource management server sequentially reads out the retained radio base-station information from a head radio base station by radio base station (step 521), and acquires a list (NB_list) of the neighboring radio base stations utilizing a frequency channel (F_cur) identical to the frequency channel that the selected radio base station (its own station) utilizes (step 522).

Next, the radio-resource management server acquires a list (NB_list1) of the radio base stations belonging to the radio operator identical to the radio operator to which the selected radio base station belongs, out of the radio base stations to be included in this list (NB_list) (step 523), and acquires a list (NB_list2) of the radio base-stations that belong to the radio operator different from the radio operator to which the selected radio base station belongs, and are controllable by the radio-resource management server, out of the radio base stations to be included in this list (NB_list) (step 524). The meaning of these NB_list1 and NB_list2 is similar to the explanation of FIG. 13.

Next, the radio-resource management server switches on a fault-notification flag FL_notify for the base station, of which the received level exceeded a threshold Ic_fl1, and of which a fault-notification-done flag FL_notify_done is off, out of the radio base stations to be included in the list (NB_list1) (step 525). Also, it sets the fault-notification flag FL_notify to be on for the base station, of which the received level exceeded a threshold Ic_fl2, and of which a fault-notification-done flag FL_notify_done is off, out of the radio base stations to be included in the list (NB_list2) (step 526).

Also herein, the reason why the threshold of the interference quantity (received level) is sorted out between the identical radio operator and the radio operator other than it is that it is necessary to suppress the quantity of the interference with the other radio operator at a lower level than that within the identical radio operator. After the radio-resource management server marked the base stations for which the fault notification had to be made in a general way, it sequentially reads out the radio base station information (step 527), transmits a radio-resource management message to the network management server of the radio operator to which the radio base station for which the fault-notification flag FL_notify was set to be on (step 528) belongs, and notifies to it.

the occurrence of the fault the interference quantity the quantity of the transmitted power that the radio base station should attenuate the value of the frequency channel that that radio base station should alter or the area in which the radio base station should be re-arranged (step 529).

Furthermore, the fault-notification-done flag FL_notify_done is set to be off for the radio base station for which the notification was made (step 530) so that the fault notification is not made repeatedly. This fault-notification-done flag may be manually set to be off when the fault was cancelled, or may be automatically set to be off by confirming that the fault was cancelled, and stability was kept.

Figure 16:
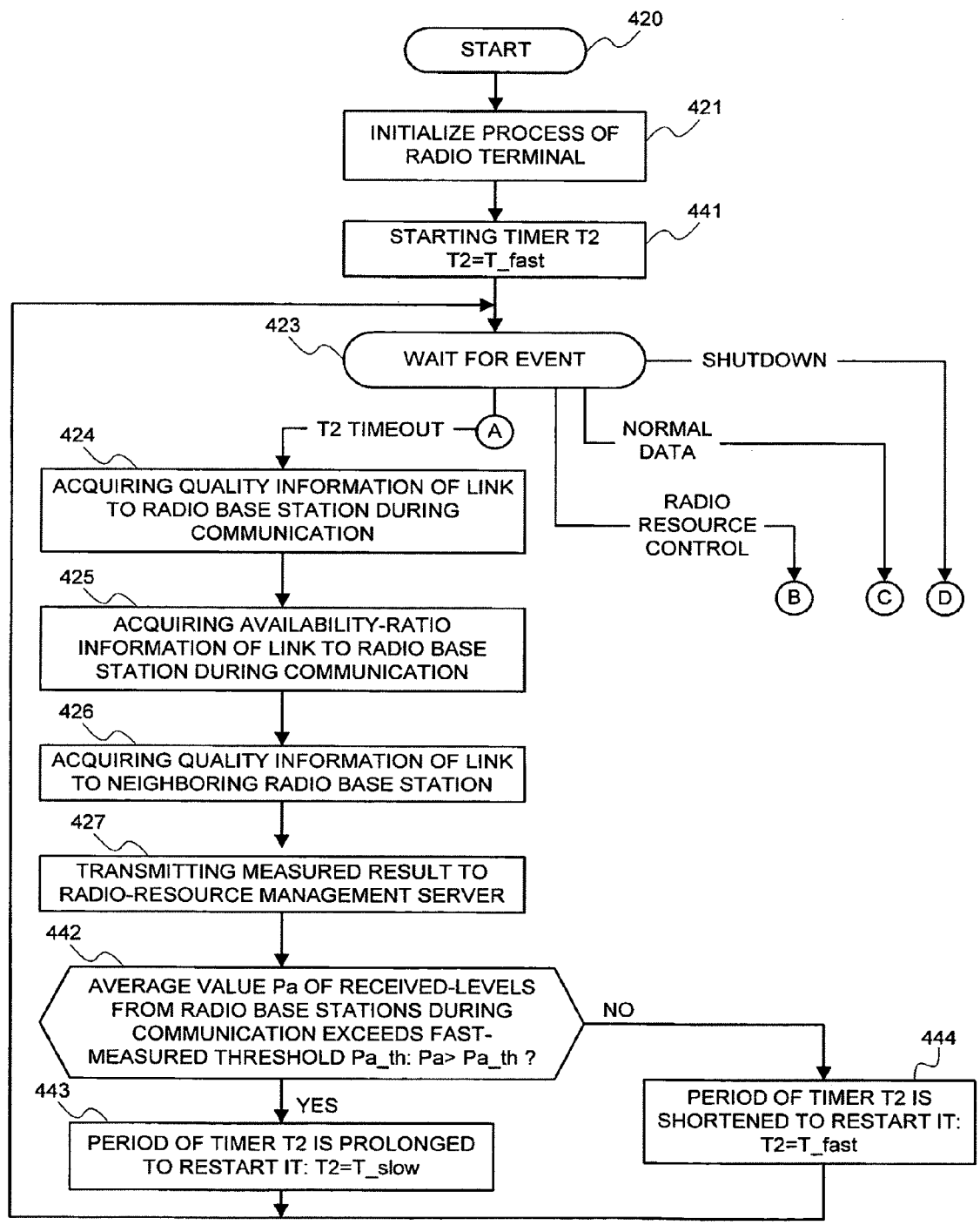
FIG. 16 is an operational flowchart of the radio terminal in the second embodiment of the present invention.

In FIG. 16 is illustrated an operational flowchart of the radio terminal in a second embodiment of the present invention. In the second embodiment of the present invention, the value of the timer is switched over in two stages responding to the link quality at the moment that the radio terminal notifies the link quality to the radio-resource management server. In an initial state, the value of the timer T2 is set at T_fast of which the period is short in advance (step 441), and the value of the timer T2 is switched over to T_slow of which the period is long at the moment that an average level value Pa received from the radio base station during communication exceeded a fast-measured threshold Pa_th, and was stabilized in a good quality state (step 443).

On the other hand, in the event that the average received-level value Pa became equal to or less than the fast-measured threshold Pa_th, the period of the timer T2 is shorten once again for restarting it (step 444). In addition, the similar control may be applied for the radio base station. In such a manner, prolonging the notification period during the time that the quality is in good state allows the quantity of the notification traffic for control to be reduced, and the congestion of the network to be alleviated.

Figure 17:
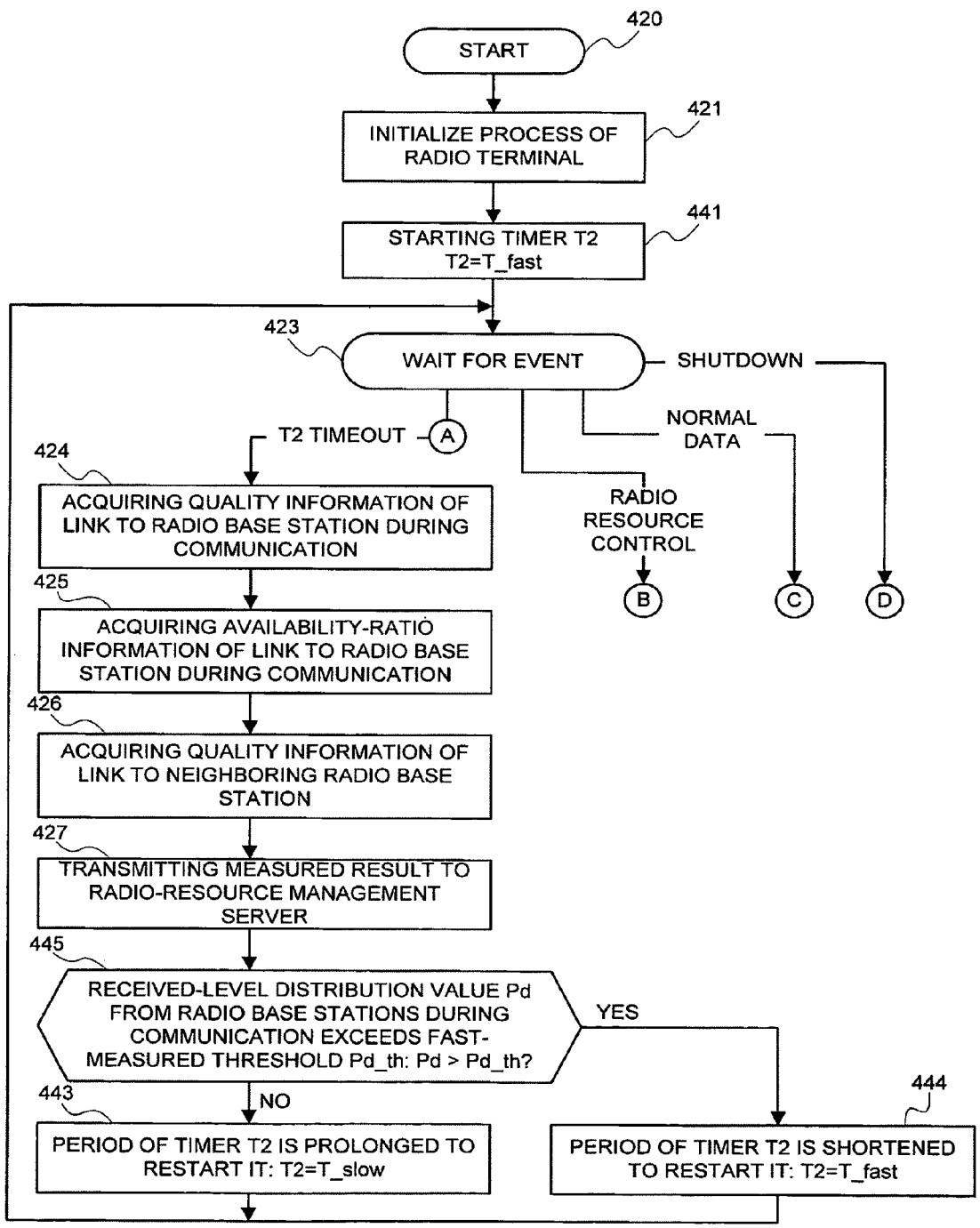
FIG. 17 is an operational flowchart of the radio terminal in the third embodiment of the present invention.

In FIG. 17 is illustrated an operational flowchart of the radio terminal in a third embodiment of the present invention. Also in this case, similarly, the value of the timer at the moment that the radio terminal notifies the link quality to the radio-resource management server is switched over in two stages; however a criterion for switching over is decided by a distribution value of the received level. In the event that a received-level distribution value Pd from the radio base-station during communication falls below a fast-measured threshold Pd_th (step 445), fluctuation in the quality is regarded to be mild, and the measurement period T2 is set to be long (step 443). In the event that the distribution value Pd exceeded Pd_th, the measurement period T2 is set to be short once again (step 444). In addition, the similar control may be applied for the radio base station.

In such a manner, setting the notification period to be long during the time that the quality is in good state allows the quantity of the notification traffic for control to be reduced, and the congestion of the network to be alleviated.

Figure 18:
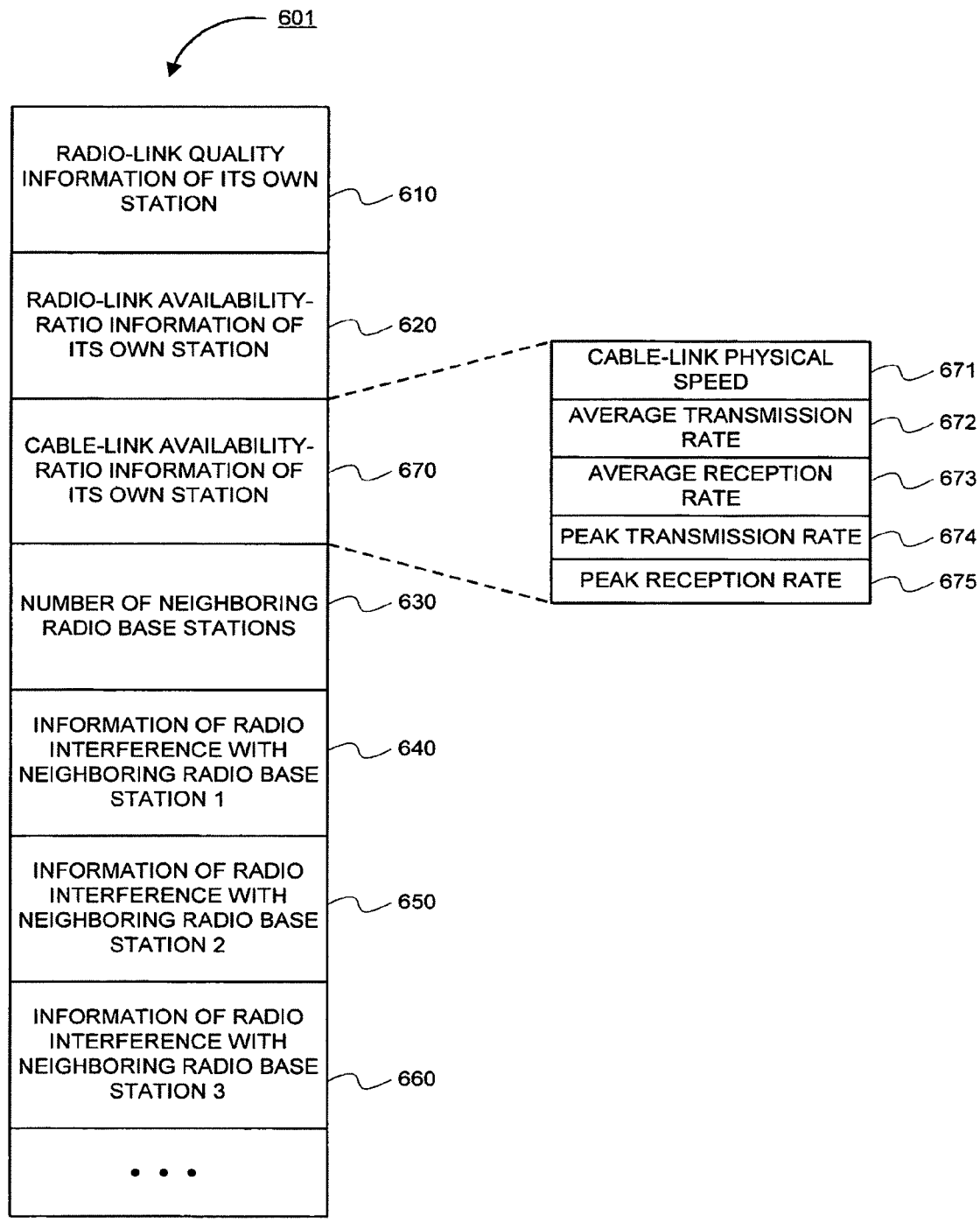
FIG. 18 is a view illustrating contents of the radio-link measured information to be transmitted from the radio base station to the radio-resource management server in the fourth embodiment of the present invention.

In FIG. 18 is illustrated contents of radio-link measured information 601 to be transmitted from the radio base station to the radio-resource management server in a fourth embodiment of the present invention. A difference between it and the radio-link measured information 600 in the first embodiment is to include cable-link availability-ratio information of its own station 670. The cable-link availability-ratio information of its own station 670 is configured of a cable-link physical speed 671, an average transmission rate 672, an average reception rate 673, a peak transmission rate 674, and a peak reception rate 675.

The average transmission rate 672 and the average reception rate 673 are average bit rates obtained by dividing the bit numbers that the radio base station transmitted/received via the cable link connected hereto during the measurement period by the measurement period respectively. The peak transmission rate 674 and the peak reception rate 675 represent the maximum bit numbers transmitted/received via the cable link for any one second during the measurement period respectively.

Figure 19:
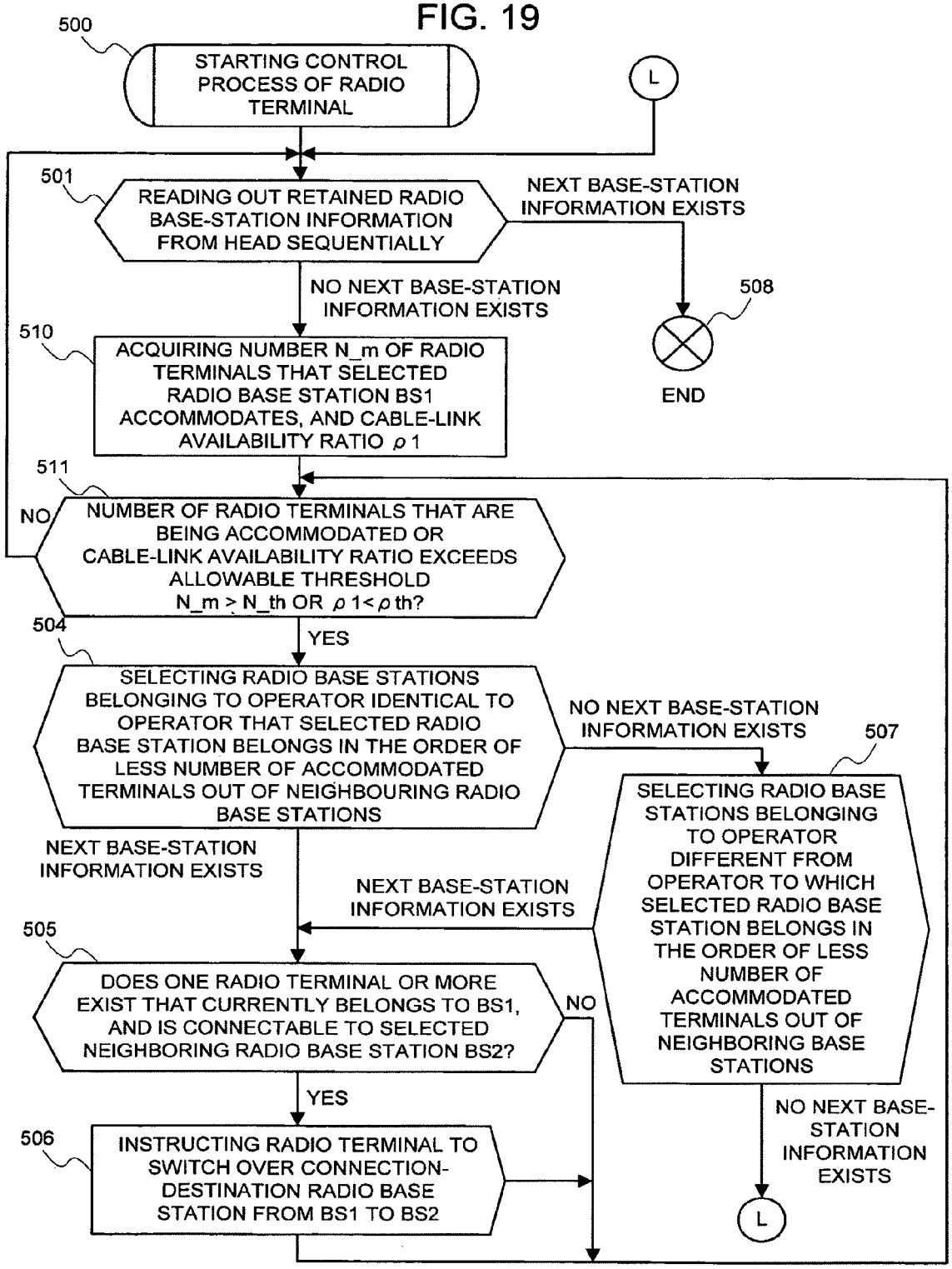
FIG. 19 is an operational flowchart of the intra-radio-base-station load distribution in the fourth embodiment of the present invention.

In FIG. 19 is illustrated an operational flowchart of the intra-radio-base-station load distribution in the fourth embodiment of the present invention. In the fourth embodiment, the radio-resource management server gives an instruction of the handover to the radio terminal, thereby allowing the load distribution to be realized. A difference between it and the load distribution in the first embodiment (FIG. 14) is steps 510 and 511. That is, as shown in these steps 510 and 511, consideration was taken into an availability ratio of the cable link (ρ1=the average rate/the physical speed of the cable link) as a criterion for starting the load distribution in addition to the number of the radio terminals that the radio base station accommodates. In such a manner, making the load distribution responding to the congestion status of the upstream cable links 300 to 304 as well in addition to the load of the radio link enables the more efficient distribution of the load as a whole of the network.

Figure 20:
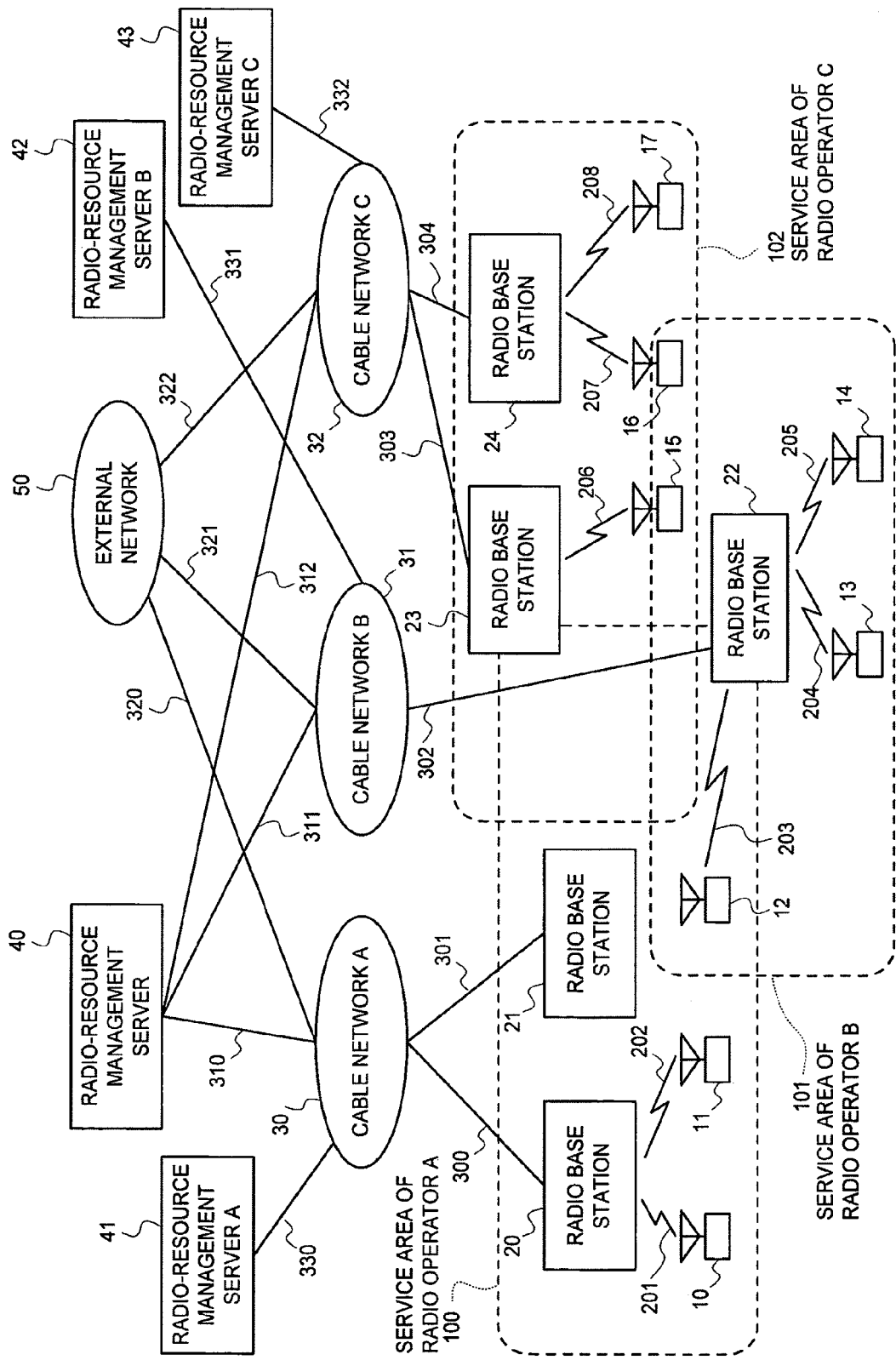
FIG. 20 is a configuration diagram of the radio-resource management system in the fifth embodiment of the present invention.

In FIG. 20 is illustrated a configuration view of the radio-resource management system in a fifth embodiment of the present invention. In this fifth embodiment, the radio operators A, B, and C install radio-resource management servers 41, 42, and 43 respectively. In this case, after once the radio-link measured information that the radio terminal or the radio base station transmitted were aggregated in the radio-resource management servers 41, 42, and 43 of the radio operators respectively, they are transferred to the radio-resource management server 40 in a mass.

In such a manner, transferring the radio-link measured information in a lump to the radio-resource management server that is a third-party organ after it was brought together within each operator allows the quantity of the control traffic to be reduced.

Figure 21:
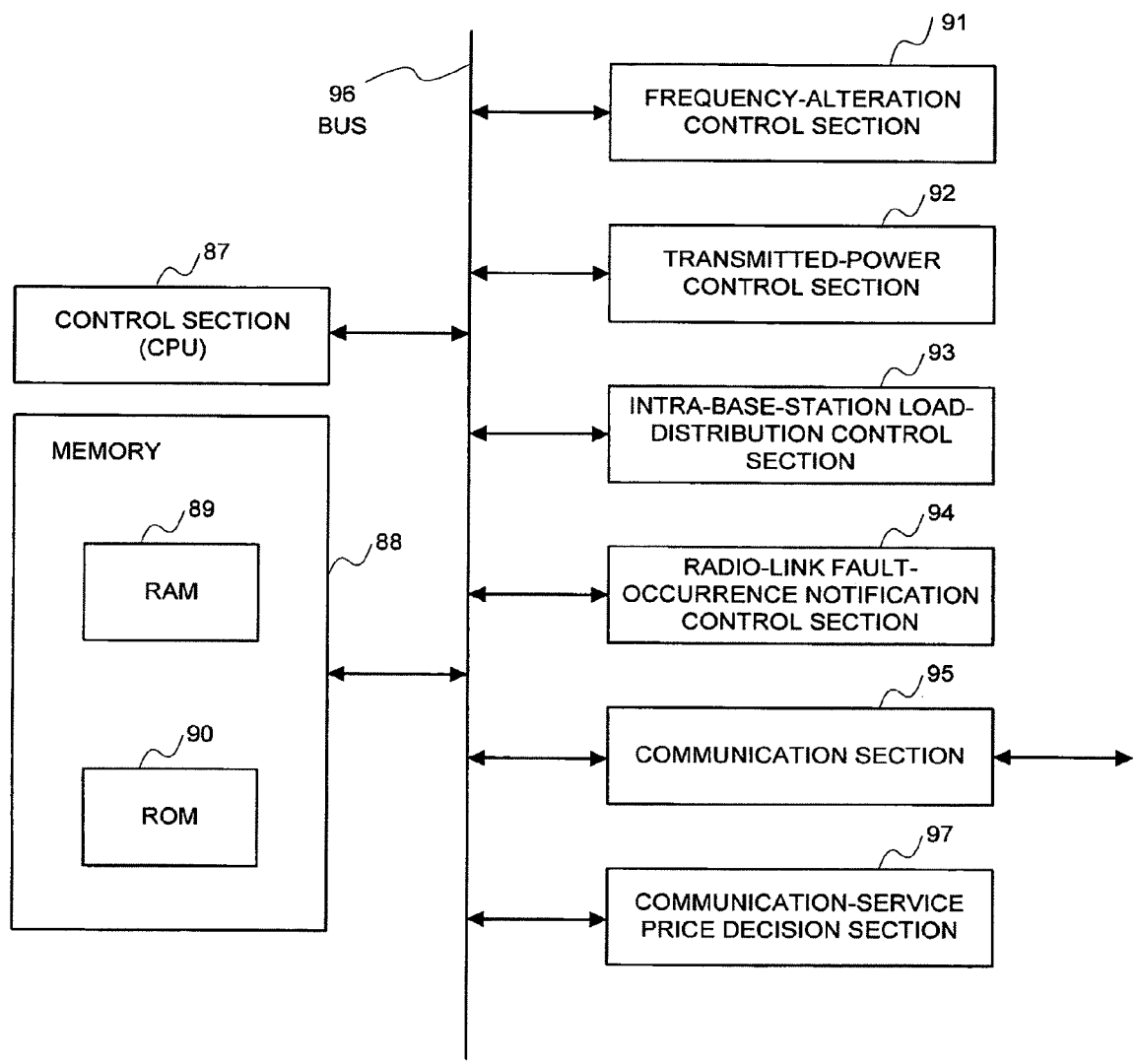
FIG. 21 is a schematic block diagram of the radio-resource management server 40 in the fifth embodiment of the present invention.

A schematic functional block diagram of the radio-resource management server 40 of this third-party organ is illustrated in FIG. 21, and the identical parts to FIG. 8 are indicated with the identical numerals. A communication service price decision section 97 was added to the block of FIG. 8 in FIG. 21, and the other configuration is identical to that of FIG. 8. This communication service price decision section 97 has a function of, responding to the quality etc. of each of the radio links of a plurality of the radio operators, taking decision control of a price at which the communication service is offered to the external network, and the details of its operation are shown in FIG. 22 and FIG. 23.

Figure 22:
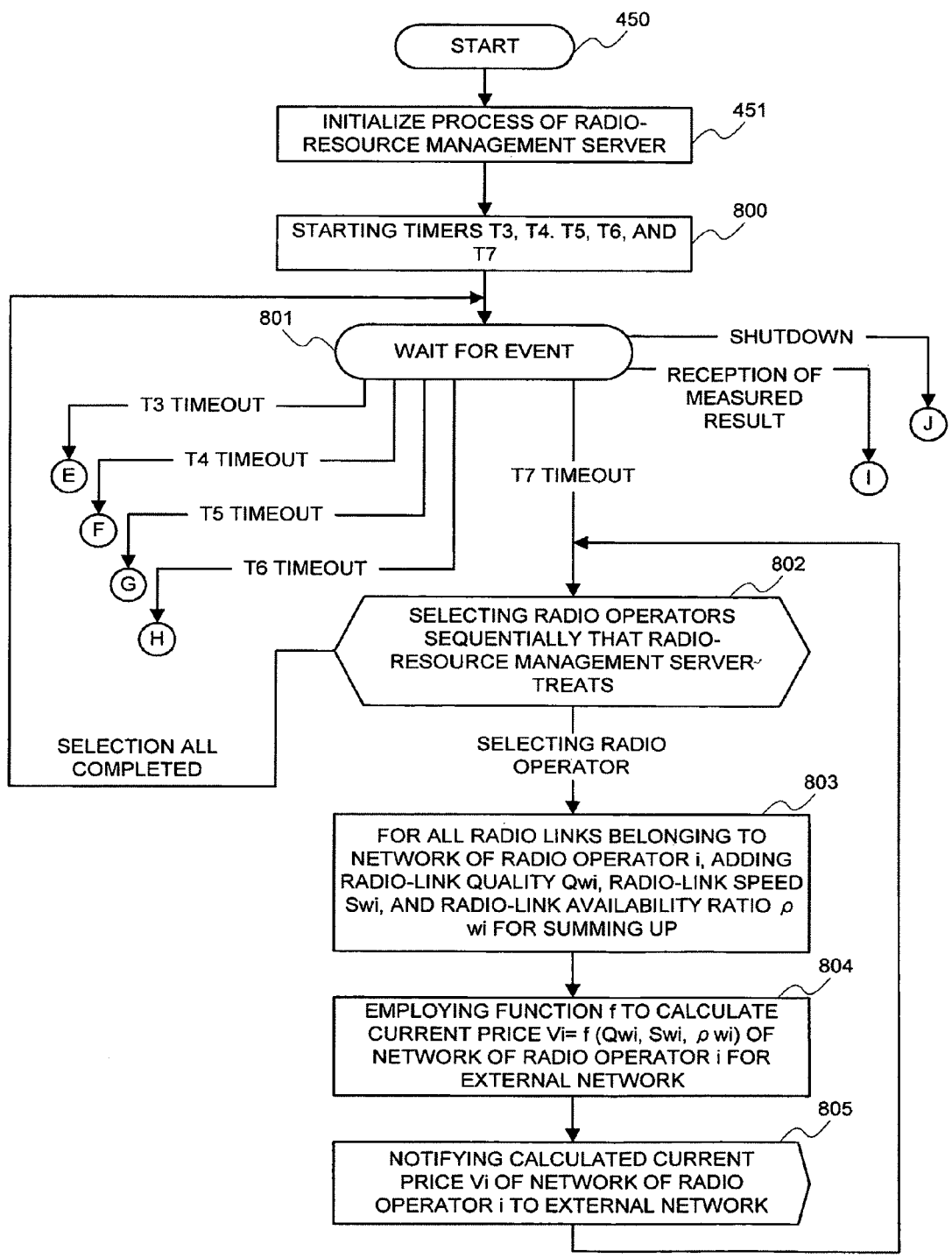
FIG. 22 is an operational flowchart of the radio-resource management server in the sixth embodiment of the present invention.
Figure 23:
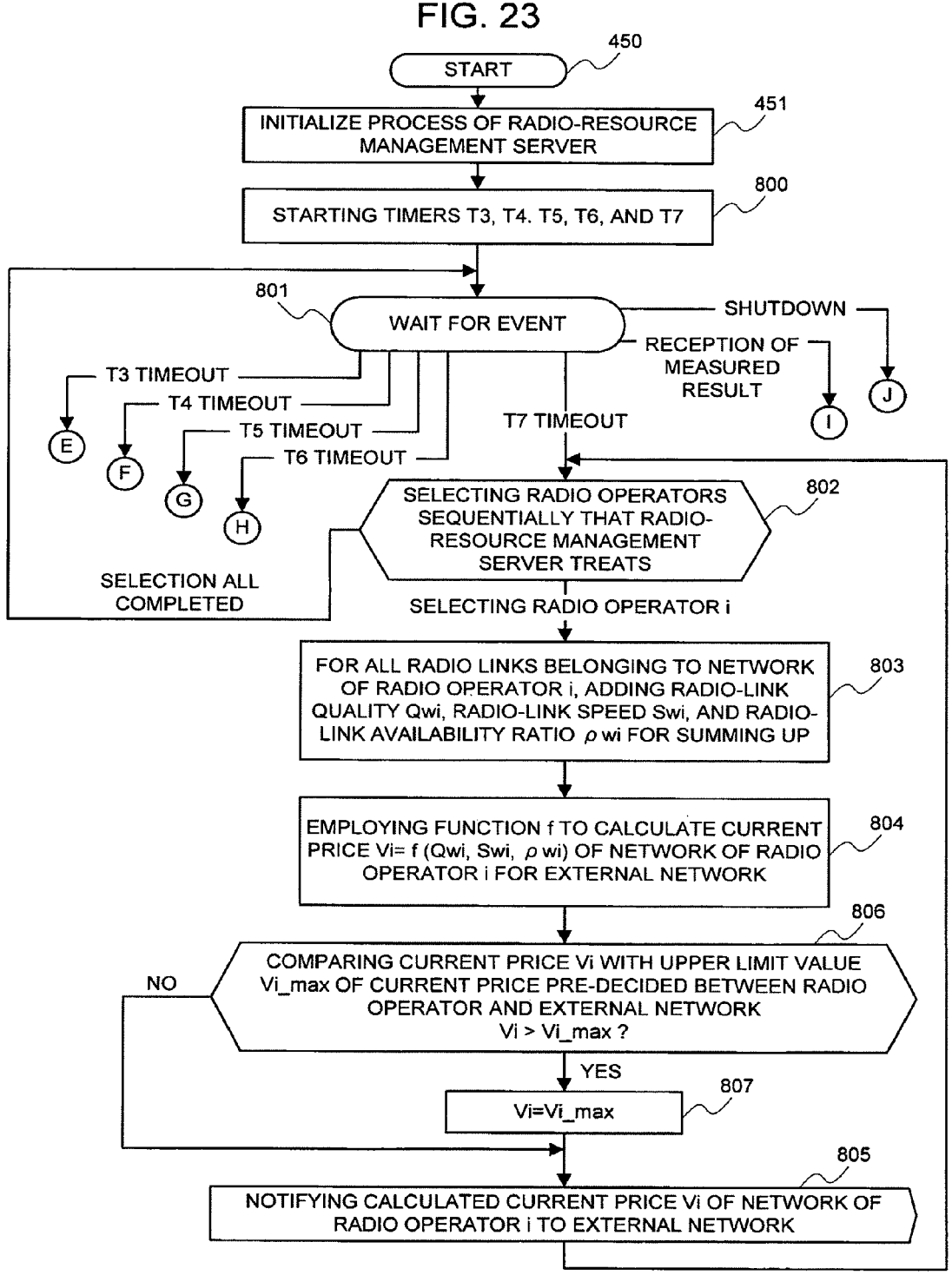
FIG. 23 is an operational flowchart of the radio-resource management server in the seventh embodiment of the present invention.

In FIG. 22 is illustrated an operational flowchart of the radio-resource management server, in particular, the communication service price decision section 97 in a sixth embodiment of the present invention. The identical parts to FIG. 9 are indicated with the identical numerals in FIG. 22. In this sixth embodiment, the radio-resource management server decides the price at which the communication service via the network of each radio operator is offered to the external network, and notifies this price to the above external network (steps 802 to 805). At this time, as an element for deciding this price, there are each quality (Qwi) of all radio links belonging to a radio operators i, each speed (Swi) of the radio links, and each availability ratio (ρwi) of the radio links, and the values obtained by adding these respective qualities (Qwi), speeds (Swi), and availability ratios (ρ wi) for summing up are employed (step 803).

For example, each quality (Qwi) of the radio links can be calculated from the received-packet error ratio (616 of FIG. 4), each speed (Swi) of the radio links from the radio-link physical speed (621 of FIG. 4), and each availability ratio (ρwi) of the radio links from the average transmission rate (623 of FIG. 4), the average reception rate (624 of FIG. 4), and the radio-link physical speed (621 of FIG. 4), respectively.

And, a predetermined price decision function f (Qwi, Swi, ρwi) is employed to calculate a current price Vi for the external network of the radio operator i. The calculated current price Vi is notified to the external network from the radio-resource management server (step 805), and in addition hereto, is notified to each radio operator and each radio terminal as well. In such a manner, altering the price of the circuit responding to the speed, the quality, and the availability ratio of the radio link group allows the optimal network of the radio operator to be always offered to the external network.

For example, the function shown below can be employed as if (Qwi, Swi, ρwi).

$$f(Qwi, Swi, \rho wi) = \alpha Qwi + \beta Swi + \gamma \rho wi$$

where $\alpha + \beta + \gamma = 1$

Also, the above-mentioned price decision and notification process are executed by taking the time-out of the timer T7 as a trigger after initializing the radio-resource management server.

In FIG. 23 is illustrated an operational flowchart of the radio-resource management server, in particular, the communication service price decision section 97 in a seventh embodiment of the present invention. The identical parts to FIG. 22 are indicated with the identical numerals in FIG. 23. In this seventh embodiment, in addition to the operation of the sixth embodiment shown in FIG. 22 is added an operation for causing the external network to receive the guarantee that the current price of the circuit of the radio operator i does not exceed a predetermined upper limit value Vi_max in compensation for a radio-resource management fee that was paid to an entity operating the radio-resource management server from the external network.

That is, the third-party organ operating the radio-resource management server decides the operational fee for operating it so that the price at which the communication service via the network of each radio operator is offered to the external network becomes equal to or less than the upper limit value predetermined between the third-party organ and the external network, and collects its charge from the operator of the external network. And, in the event that the price of the communication service does not reach the above upper limit value, the third-party organ is to offer the communication service to the external-network operator at a then price (current price).

For this, the process of restraining the current value Vi to Vi_max is performed in the radio-resource management server (step 807) in the event that the computed current price Vi exceeded the above upper limit value Vi_max (step 806). The other process is similar to that of the sixth embodiment of FIG. 22.

Needless to say, the operational flow of each apparatus mentioned above is realized by pre-filing it as a program in a record medium such as a ROM to cause the CPU that is a computer to read it for execution.

Figure 24:
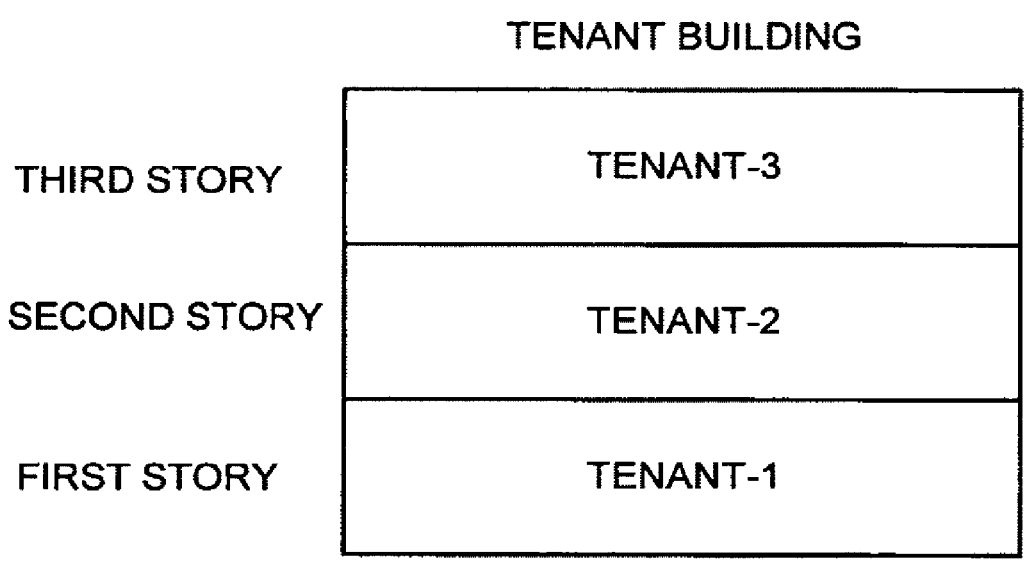
FIG. 24 is a view illustrating an example of the tenant building for realizing the business model of the eighth embodiment of the present invention.

A technique of a business model employing the foregoing radio-resource management system as an eighth embodiment of the present invention will be explained below while a reference is made to the accompanied drawings. As one example, a case is described where the radio communication operator operates the radio communication system such as a LAN in a three-storied tenant building as shown in FIG. 24. A tenant-1 to a tenant-3 utilize the floors of this tenant building respectively, and an owner of the tenant building manages the radio resource of the radio communication system that the tenant-1 to the tenant-3 operate, thereby allowing the radio communication quality to be guaranteed and an additive value of the building itself to be enhanced.

Figure 25:
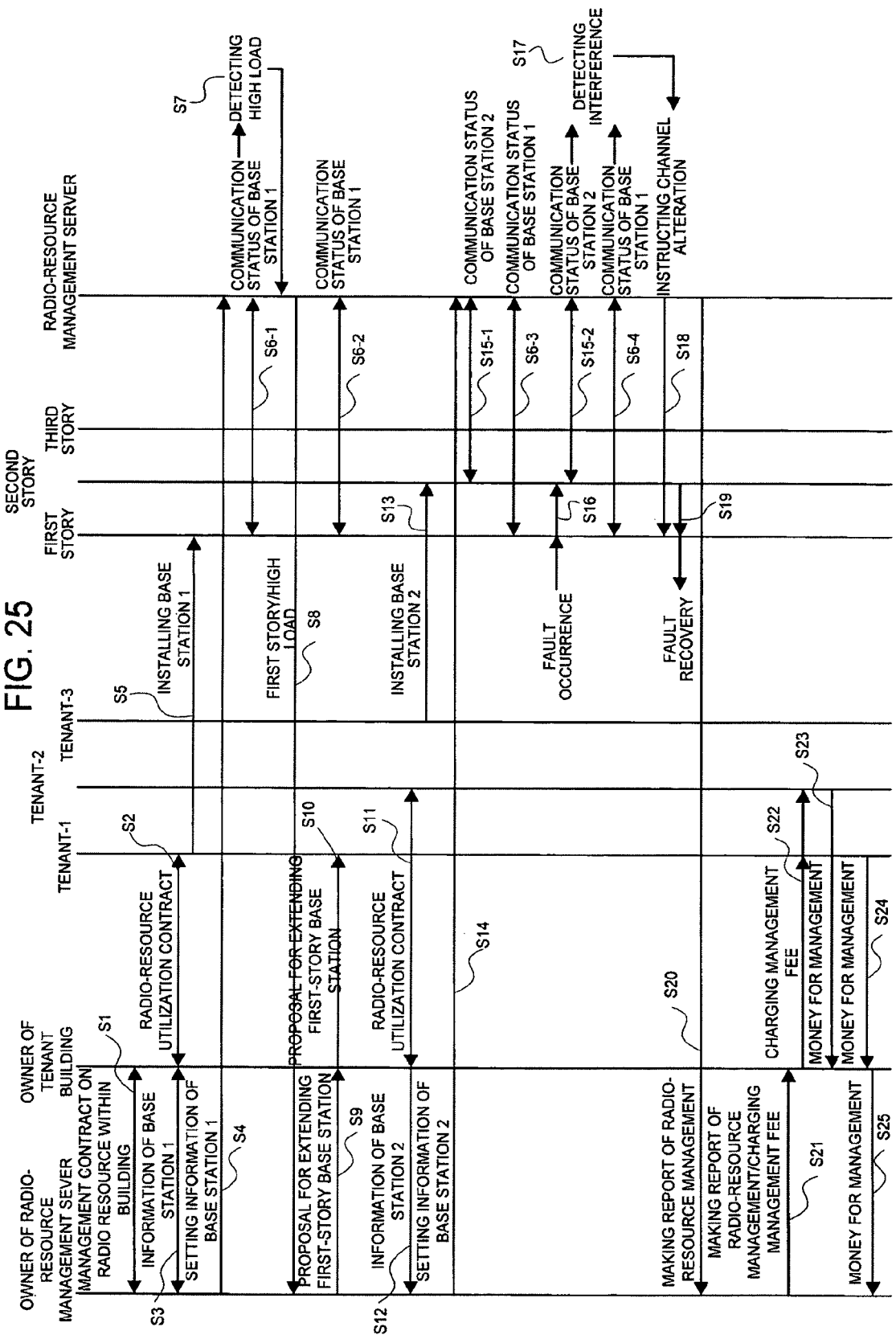
FIG. 25 is a view illustrating an operational sequence of the radio-resource management system for realizing the business model in the eighth embodiment of the present invention.

An operational sequence of the embodiment of the business model in this example is illustrated in FIG. 25. The owner of this building makes a management contract on the radio resource within the building with an owner of the radio-resource management server (step S1), and entrusts him/her with a radio-resource management business employing the radio-resource management server. And, the tenant (for example, the tenant-1) who desires to operate the radio communication service makes a radio-resource utilization contract with the owner of the building (step S2).

In the event that the tenant utilizes radio facilities such as the radio base station, he/she registers radio-facility information relating to the radio facilities to the radio-resource management server via the owner of the building and the owner of the radio-resource management server (steps S3 and S4), and actually installs the radio facilities (for example, the radio base station) (step S5).

The radio-resource management server acquires the radio-link measured information 600 (see FIG. 4) and 700 (see FIG. 7) from the registered radio facilities and the radio terminals, and supervises the communication status of the radio communication operator. That is, it supervises the occurrence of the fault such as the occurrence of high-load status and the occurrence of the interference day after day (steps S6-1 to S6-4). And, when the radio-resource management server detects a high-load communication status (step S7), it presents, for example, a fault-avoidance countermeasure such as extending the radio facilities, and altering the installment-location of the radio facilities, etc. via the owner of the radio-resource management server and the owner of the building to the tenant having the radio facilities where the high-load communication status is occurring (steps S8 to S10).

Herein, in the event that other tenant (for example, the tenant-2) utilizes the similar radio facilities, similarly to the explanation made in the event of the former tenant-1, he/she makes the radio-resource utilization contract (step S11). And, the radio-facility information relating to the radio facilities of the tenant-2 is registered to the radio-resource management server (step S12), and the radio facilities are installed actually (steps S13 and S14).

The radio-resource management server acquires the radio-link measured information 600 and 700 from the registered radio facilities of the tenant-2 and the radio terminals, and similarly supervises its communication status day after day (steps S15-1 and S15-2). At this time, when the interference occurs between the base stations that are the radio facilities of the tenant-1 and the tenant-2 (step S17), the radio-resource management server outputs an instruction of the alteration of the frequency, the alteration of the transmitted power, etc. to the radio facilities causing the interference to occur in order to cancel the interference (step S18), and presents an interference avoidance countermeasure. When the fault is removed thereby (step S19), the radio-resource management server makes a report of its effect to its owner (step S20).

In such a manner, in the event that the owner of the radio-resource management server supervised the daily radio communication status employing the radio-resource management server to detect the fault, he/she makes a rule of offering the service for carrying out the automatic avoidance, the notification of the fault, and the presentation of a fault-cancellation idea. The matter stands in such a manner that the owner of the radio-resource management server charges the management fee etc. including a fee for the above service to the owner of the building who is a person enjoying this service (step S21), and that the owner of the building pays the radio-resource management service fee to the owner of the radio-resource management server (step 25), and the owner of the building charges the radio-resource utilization fee to the tenant who made the radio resource contract (steps S23 and S24).

At this time, by establishing disparity in level (class) of the service to be offered to the tenant in advance, different service fees can be set responding to the level of the service. For example, (1) A service only for automatic interference avoidance,
(2) A notification service of the high-load communication status in addition to the above-mentioned (1),
(3) A presentation service of a fault-avoidance countermeasure in addition to the above-mentioned (2), and so forth can be considered. As to the interference, it is apparent, that a business model technique also can be considered of, by regarding the tenant-1 to the tenant-3 as the radio operator, making the management contract directly with the owner of the radio-resource management server without going through the owner of the building. In this case, the owner of the radio-resource management server is to be entrusted with the radio resource management of the radio communication operator to offer a service enabling an offer of the high-quality radio communication environment to contracted users of the radio communication operator.

Figure 26:
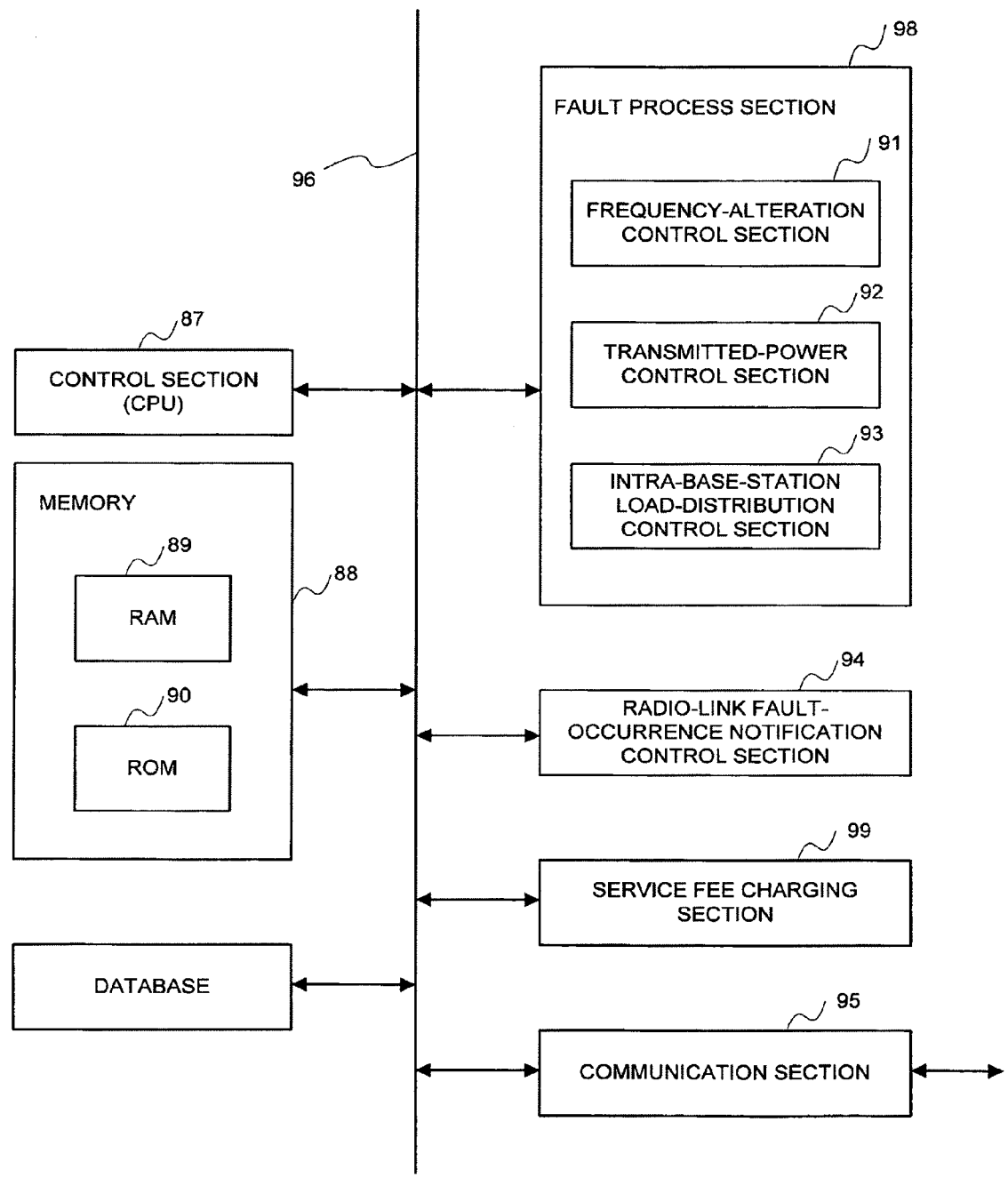
FIG. 26 is a functional block diagram of the radio-resource management server for realizing the business model in the eighth embodiment of the present invention.

FIG. 26 is a view illustrating an outline of a functional block diagram of the radio-resource management server to be employed for the business model technique shown in FIG. 25, and the identical parts to FIG. 8 are indicated with the identical numerals. In FIG. 26, a fault process section 98 has a frequency-alteration control section 91, a transmitted-power control section 92, and a base-station load-distribution control section 93, and each of these stations 91 to 93, which has an identical function to each of the sections 91 to 93 shown in FIG. 8 respectively, receives the radio-link measured information 600 and 700 from the radio facilities to supervise the communication status of the radio link, and to detect the fault occurrence (the interference and the high load), and performs an avoidance-countermeasure process of it.

In a database 100 are registered information relating to a person enjoying the service who made the radio-resource management contract, information relating to the radio facilities, information relating to the service level (class), and information relating to its service fee, etc. A service fee charging section 99 charges the service fee to the owner of the building (in the event of bypassing the owner of the building, directly to the tenant of the building) based on information registered in this database 100. The other configuration and the function are identical to that of FIG. 8, and its explanation is omitted.

As mentioned above, in accordance with the present invention, the effect exists that, by managing the wireless network quality of a plurality of the radio operators in a integrated manner to alter the frequency channel of the radio base station, the transmitted power, the terminal to be accommodated, and so forth responding to a necessity, it becomes possible to optimally operate the radio resource that is held in common.

What is claimed is:

1. A radio-resource management method comprising a control step of, based on radio-link quality information to be notified from at least one of a plurality of radio base stations and radio terminals belonging to respective different operators, taking transmitted-power control for said radio base station, wherein said radio-link quality information includes at least a received level of a radio link, and that said control step has a step of, out of the radio base stations that utilize a frequency identical to the frequency that said radio base station currently utilizes and yet belong to an identical radio operator, taking transmitted-power reduction control for the radio base station, of which the received level exceeded a first threshold, and of which current transmitted power is equal to or more than a lower limit value.

2. The radio-resource management method according to claim 1, wherein said radio-link quality information is notified at a predetermined notification period.

3. The radio-resource management method according to claim 2, wherein, in the event that a link quality of the radio link exceeded a predetermined threshold, said notification period is set to be longer than it is set in the event that it is equal to or less than said threshold.

4. The radio-resource management method according to claim 2, wherein, in the event that a distribution value of the link quality of the radio link measured within a constant period exceeded a predetermined threshold, said notification period is set to be longer than it is set in the event that it is equal to or less than said threshold.

5. A radio-resource management method comprising a control step of, based on radio-link quality information to be notified from at least one of a plurality of radio base stations and radio terminals belonging to respective different operators, taking transmitted-power control for said radio base station, wherein said control step has a step of, out of the radio base stations that utilize a frequency identical to the frequency that said radio base station currently utilizes and yet belong to a different radio operator, taking second transmitted-power reduction control for the radio base station, of which the received level exceeded a second threshold, and of which current transmitted power is equal to or more than a lower limit value.

6. The radio-resource management method according to claim 5, wherein said radio-link quality information is notified at a predetermined notification period.

7. The radio-resource management method according to claim 6, wherein, in the event that a link quality of the radio link exceeded a predetermined threshold, said notification period is set to be longer than it is set in the event that it is equal to or less than said threshold.

8. The radio-resource management method according to claim 6, wherein, in the event that a distribution value of the link quality of the radio link measured within a constant period exceeded a predetermined threshold, said notification period is set to be longer than it is set in the event that it is equal to or less than said threshold.

9. A radio-resource management apparatus comprising controller for, based on radio-link quality information to be notified from at least one of a plurality of radio base stations and radio terminals belonging to respective different operators, taking transmitted-power control for said radio base station, wherein said radio-link quality information includes at least a received level of a radio link, and that said controller has means for, out of the radio base stations that utilize a frequency identical to the frequency that said radio base station currently utilizes, and yet belong to an identical radio operator, taking transmitted-power reduction control for the radio base station, of which the received level exceeded a first threshold, and of which current transmitted power is equal to or more than a lower limit value.

10. A radio-resource management apparatus comprising controller for, based on radio-link quality information to be notified from at least one of a plurality of radio base stations and radio terminals belonging to respective different operators, taking transmitted-power control for said radio base station, wherein said controller has means for, out of the radio base stations that utilize a frequency identical to the frequency that said radio base station currently utilizes, and yet belong to a different radio operator, taking second transmitted-power reduction control for the radio base station, of which the received level exceeded a second threshold, and of which current transmitted power is equal to or more than a lower limit value.

* * * * *